United States Patent [19]
Narita

[11] Patent Number: 5,722,912
[45] Date of Patent: Mar. 3, 1998

[54] LOCK-UP CONTROL SYSTEM FOR AUTOMATIC TRANSMISSIONS

[75] Inventor: Kennosuke Narita, Wako, Japan

[73] Assignee: Honda Giken Kogyo Kabushiki Kaisha, Tokyo, Japan

[21] Appl. No.: 704,989

[22] Filed: Aug. 29, 1996

[30] Foreign Application Priority Data

Aug. 30, 1995 [JP] Japan .................................. 7-243860
Aug. 30, 1995 [JP] Japan .................................. 7-243861
Aug. 30, 1995 [JP] Japan .................................. 7-243862

[51] Int. Cl.$^6$ ........................................ F16H 61/14
[52] U.S. Cl. .............. 477/64; 477/76; 477/174; 477/176; 477/901; 192/3.31
[58] Field of Search ............... 477/62, 64, 65, 477/76, 901, 176, 118, 174, 175; 192/3.31, 82 T

[56] References Cited

U.S. PATENT DOCUMENTS

| | | | |
|---|---|---|---|
| 4,768,635 | 9/1988 | Sakurai et al. | 192/3.31 |
| 4,911,275 | 3/1990 | Ohkumo et al. | 477/901 |
| 5,434,780 | 7/1995 | Kume et al. | 477/63 |
| 5,643,136 | 7/1997 | Kono et al. | 477/174 |
| 5,651,752 | 7/1997 | Wakahara et al. | 477/62 |

FOREIGN PATENT DOCUMENTS

| | | |
|---|---|---|
| 62-238126 | 10/1987 | Japan . |
| 63-47561 | 2/1988 | Japan . |
| 63-235764 | 9/1988 | Japan . |
| 1-120479 | 5/1989 | Japan . |

*Primary Examiner*—Charles A. Marmor
*Assistant Examiner*—Sherry Lynn Estremsky
*Attorney, Agent, or Firm*—Nikaido, Marmelstein, Murray & Oram LLP

[57] ABSTRACT

A lock-up control system for an automatic transmission of an automotive vehicle controls operation of a lock-up clutch for mechanically engaging the automatic transmission with the engine to enable transmission of a driving force output from the engine to the automatic transmission. An engaging force of the lock-up clutch is controlled in an predetermined operating region of the automotive vehicle, which is determined based on operating conditions of the automotive vehicle and the engine, in such a manner that an amount of slip of the lock-up clutch becomes equal to a desired value. An engaging force control amount for controlling the engaging force of the lock-up clutch is learned when the automotive vehicle is traveling in the predetermined operating region with the automatic transmission being in a predetermined speed position, and a learned value thus obtained is stored. The engaging force control amount is calculated by correcting the stored learned value according to load on the engine, when the automotive vehicle is traveling with the automatic transmission being in a speed position which is suitable for a lower traveling speed of the automotive vehicle than the predetermined speed position. The engaging force of the lock-up clutch is controlled by the use of the corrected engaging force control amount, when the automotive vehicle is traveling with the automatic transmission being in the above speed position which is suitable for the lower speed of the automotive vehicle.

17 Claims, 13 Drawing Sheets

LOCK-UP CONTROL SYSTEM FOR AUTOMATIC TRANSMISSIONS

BACKGROUND OF THE INVENTION

1. Field of the Invention

This invention relates to a lock-up control system for automatic transmissions of automotive vehicles, which controls the operation of a lock-up torque converter of an automatic transmission and the engaging force of a lock-up clutch employed in the lock-up torque converter.

2. Prior Art

Conventionally, a lock-up control system for automatic transmissions of automotive vehicles has been proposed e.g. by Japanese Laid-Open Patent Publication (Kokai) No. 63-47561, in which the lock-up clutch of a lock-up torque converter of an automatic transmission, which is usually engaged when the automatic transmission is in any of higher speed positions, i.e. third and fourth speed positions, is engaged even when the same is in a second speed position, for the purpose of reducing the fuel consumption of an internal combustion engine installed on the automotive vehicle, etc.

Further, there has been conventionally carried out a control method of storing in a memory device desired values of a slip amount of the lock-up clutch, which are set depending on operating conditions of the engine in a manner corresponding to respective shift positions of the transmission, and controlling the engaging force of the lock-up clutch such that the slip amount becomes equal to one of the desired values corresponding to a selected shift position, as well as learning a control amount used in controlling the engaging force of the lock-up clutch under a specific operating condition of the engine to store a learned value of the control amount in a memory device and applying the learned value as an initial value of the control amount for controlling the engaging force of the lock-up clutch immediately after the engine has entered the specific operating condition (i.e. so-called learning control).

However, to conduct the learning control on such a lock-up control system as proposed by Japanese Laid-Open Patent Publication (Kokai) No. 63-47561, in which the lock-up clutch is engaged even when the automatic transmission is in the second speed position, a larger capacity is required for the memory device of the control system, resulting in an increased manufacturing cost.

Further, there has already been proposed, e.g. by Japanese Laid-Open Patent Publication (Kokai) No. 1-120479, a slip control system for controlling a slip amount of a hydraulic pressure-operated lock-up clutch of a lock-up torque converter of an automatic transmission for automotive vehicles, in which, when the temperature of hydraulic oil for operating the hydraulic pressure-operated lock-up clutch is low, feedback control of the slip amount of the lock-up clutch is inhibited, but a predetermined control value is used for controlling the slip amount of the lock-up clutch.

However, the slip control system disclosed in Japanese Laid-Open Patent Publication (Kokai) No. 1-120479 does not contemplate carrying out the learning control, so that there arises the following problem:

When the temperature of the hydraulic oil is low, the viscosity of the hydraulic oil becomes high, which increases the flow resistance of a hydraulic pressure control system for actuating the lock-up clutch. As a result, when the temperature of the hydraulic oil is low, a control amount required for obtaining a certain engaging force is different from a control amount required for obtaining the same engaging force when the temperature of the hydraulic oil is high after completion of warming-up of the engine. Therefore, if the control amount for controlling the engaging force of the lock-up clutch is learned when the temperature of the hydraulic oil is low, and the resulting learned value of the control amount is applied when the temperature of the hydraulic oil is high, surging or a shock is likely to occur.

Further, there have been proposed a control system for automatic clutches of automotive vehicles, in which, if acceleration of a vehicle is above a predetermined value with the accelerator pedal released, it is judged that the vehicle is descending a slope in an accelerated manner, and then the automatic clutch is brought to a direct coupling mode (Japanese Laid-Open Patent Publication (Kokai) No. 62-238126), and a lock-up control system for automatic transmissions, which applies engine brake by bringing into effect a lock-up mechanism of a lock-up torque converter of the automatic transmission when the vehicle is being accelerated after the accelerator pedal ceases to be stepped on (Japanese Laid-Open Patent Publication (Kokai) No. 63-235764).

However, these conventional systems determine that the vehicle is descending a slope by detecting acceleration of the vehicle, and therefore they are not capable of determining that the vehicle is descending e.g. when it is traveling down a gentle slope over a long distance, which makes it impossible to effectively apply engine brake.

SUMMARY OF THE INVENTION

It is a first object of the invention to provide a lock-up control system for an automatic transmission of an automotive vehicle, which is capable of performing lock-up control of the automatic transmission in a lower speed position without degrading the driveability while disposing with the use of a memory device with an increased capacity.

It is a second object of the invention to provide a lock-up control system for an automatic transmission, which is capable of properly learning a control amount used in controlling the engaging force of the lock-up clutch to thereby prevent the vehicle from suffering surging or a shock.

It is a third object of the invention to provide a lock-up control system for an automatic transmission, which is capable of accurately detecting a long and gentle descent of the vehicle and hence effectively applying engine brake.

To attain the first object, according to a first aspect of the invention, there is provided a lock-up control system for an automatic transmission of an automotive vehicle, the automotive vehicle having an internal combustion engine installed thereon, the automatic transmission having a lock-up clutch for mechanically engaging the automatic transmission with the engine to enable transmission of a driving force output from the engine to the automatic transmission, the lock-up control system controlling operation of the lock-up clutch.

The lock-up control system according to first aspect of the invention is characterized by comprising:

operating condition-detecting means for detecting operating conditions of the automotive vehicle and the engine including load on the engine;

first engaging force control means for controlling an engaging force of the lock-up clutch, in an predetermined operating region of the automotive vehicle which is determined based on the operating conditions of the automotive vehicle and the engine detected by the operating condition-detecting means, in a manner such that an amount of slip of the lock-up clutch becomes equal to a desired value;

learning means for learning an engaging force control amount for controlling the engaging force of the lock-up clutch when the automotive vehicle is traveling in the predetermined operating region with the automatic transmission being in a predetermined speed position;

memory means for storing a learned value of the engaging force control amount obtained by the learning means;

corrected engaging force control amount-calculating means for calculating a corrected engaging force control amount by correcting the learned value of the engaging force control amount stored in the memory means according to the load on the engine, when the automotive vehicle is traveling with the automatic transmission being in a speed position which is suitable for a lower traveling speed of the automotive vehicle than the predetermined speed position; and second engaging force control means for controlling the engaging force of the lock-up clutch by the use of the corrected engaging force control amount, when the automotive vehicle is traveling with the automatic transmission being in the speed position which is suitable for the lower speed of the automotive vehicle than the predetermined speed position.

Preferably, the corrected engaging force control amount-calculating means calculates the corrected engaging force control amount in a manner such that the engaging force of the lock-up clutch becomes larger as the load on the engine is larger.

Preferably, the corrected engaging force control amount-calculating means calculates the corrected engaging force control amount by correcting the learned value stored in the memory means according to the load on the engine when the load on the engine is larger than a predetermined value, and sets the corrected engaging force control amount to a predetermined value when the load on the engine is equal to or smaller than the predetermined value.

Preferably, the lock-up control system includes means for permitting the second engaging force control means to control the engaging force of the lock-up clutch by the use of the corrected engaging force control amount when the automotive vehicle is traveling at a higher speed than a predetermined value.

Preferably, the predetermined speed position of the automatic transmission is a third speed position, and the speed position which is suitable for the lower speed of the automotive vehicle than the predetermined speed position is a second speed position.

To attain the second object, according to a second aspect of the invention, there is provided a lock-up control system for an automatic transmission of an automotive vehicle, the automotive vehicle having an internal combustion engine installed thereon, the automatic transmission having a lock-up clutch for mechanically engaging the automatic transmission with the engine to enable transmission of a driving force output from the engine to the automatic transmission, the lock-up control system controlling operation of the lock-up clutch.

The lock-up control system according to the second aspect of the invention is characterized by comprising:

operating condition-detecting means for detecting operating conditions of the automotive vehicle and the engine;

engaging force control means for controlling an engaging force of the lock-up clutch, in an predetermined operating region of the automotive vehicle determined based on the operating conditions of the automotive vehicle and the engine detected by the operating condition-detecting means, in a manner such that an amount of slip of the lock-up clutch becomes equal to a desired value;

learning means for learning an engaging force control amount for controlling the engaging force of the lock-up clutch when the automatic transmission is in the predetermined operating region;

memory means for storing a learned value of the engaging force control amount obtained by the learning means;

initial value-setting means for setting an initial value of the engaging force control amount based on the learned value of the engaging force control amount stored in the memory means when a transition to the predetermined operating region from an operating region other than the predetermined operating region takes place; and learning-inhibiting means for inhibiting the learning means from learning the engaging force control amount, when a parameter representative of temperature of a hydraulic oil for operating the lock-up clutch is lower than a predetermined value.

For example, the parameter is temperature of engine coolant detected by the operating condition-detecting means.

Alternatively, the parameter is the temperature of the hydraulic oil detected by the operating condition-detecting means.

More specifically, the predetermined operating region includes a decelerating region in which the load on the engine is substantially equal to zero, the automatic transmission is in a speed position suitable for a higher traveling speed of the automotive vehicle than a second speed position, and at the same time the automotive vehicle is traveling at a higher speed than a predetermined value.

Preferably, the lock-up control system includes descent-determining means for determining whether the automotive vehicle is descending a slope in the decelerating region, and the learning-inhibiting means inhibits the learning means from learning the engaging force control amount when it is determined that the automotive vehicle is descending a slope in the decelerating region.

Further preferably, the descent-determining means comprises operating condition continuation-determining means for determining whether the automotive vehicle has been continuously been in a predetermined operating condition over a predetermined time period, and determining means for determining that the automotive vehicle is descending a slope if a change in a traveling speed of the automotive vehicle has occurred from a value below a first predetermined value to a value above a second predetermined value higher than the first predetermined value when it is determined that the automotive vehicle has been continuously been in the predetermined operating condition over the predetermined time period.

More preferably, the predetermined operating region includes a feedback control region in which the automotive vehicle is traveling at a speed within a predetermined range determined by predetermined upper and lower limit values thereof, and at the same time load on the engine is within a predetermined range determined by predetermined upper and lower limit values thereof.

To attain the third object, according to a third aspect of the invention, there is provided a lock-up control system for an automatic transmission of an automotive vehicle, the automotive vehicle having an internal combustion engine installed thereon, the automatic transmission having a torque converter for transmitting a driving force output from the engine, and a lock-up clutch arranged in parallel with the torque converter, for mechanically engaging the torque converter with the engine to enable transmission of the driving force output from the engine to the torque converter, the lock-up control system controlling operation the lock-up clutch.

The lock-up control system according to the third aspect of the invention is characterized by comprising:

operating condition-detecting means for detecting operating conditions of the automotive vehicle and the engine;

operating condition continuation-determining means for determining whether the automotive vehicle has been continuously been in a predetermined operating condition over a predetermined time period;

descent-determining means for determining that the automotive vehicle is descending a slope if a change in a traveling speed of the automotive vehicle has occurred from a value below a first predetermined value to a value above a second predetermined value higher than the first predetermined value when it is determined that the automotive vehicle has been continuously been in the predetermined operating condition over the predetermined time period; and operating region-enlarging means for enlarging an operating region within which the lock-up clutch is to be operated, when it is determined by the descent-determining means that the automotive vehicle is descending a slope.

The engine includes a throttle valve. More specifically, the predetermined operating condition of the automotive vehicle is an operating condition in which the throttle valve is substantially fully closed and at the same time a rate of decrease in rotational speed of the engine is smaller than a predetermined value.

To attain the third object, according to a fourth aspect of the invention, there is provided a lock-up control system for an automatic transmission of an automotive vehicle, the automotive vehicle having an internal combustion engine installed thereon, the automatic transmission having a torque converter for transmitting a driving force output from the engine, and a lock-up clutch arranged in parallel with the torque converter, for mechanically engaging the torque converter with the engine to enable transmission of the driving force output from the engine to the torque converter, the lock-up control system controlling operation of the lock-up clutch.

The lock-up control system according to the fourth aspect of the invention is characterized by comprising:

operating condition-detecting means for detecting operating conditions of the automotive vehicle and the engine;

operating condition continuation-determining means for determining whether the automotive vehicle has been continuously been in a predetermined operating condition over a predetermined time period;

descent-determining means for determining that the automotive vehicle is descending a slope if a change in a traveling speed of the automotive vehicle has occurred from a value below a first predetermined value to a value above a second predetermined value higher than the first predetermined value when it is determined that the automotive vehicle has been continuously been in the predetermined operating condition over the predetermined time period; and engaging force-increasing means for increasing the engaging force of the lock-up clutch when it is determined by the descent-determining means that the automotive vehicle is descending a slope.

Preferably, the engaging force-increasing means includes means for controlling the engaging force of the lock-up clutch in a manner such that the rotational speed of the engine is increased when it is determined by the descent-determining means that the automotive vehicle is descending a slope.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
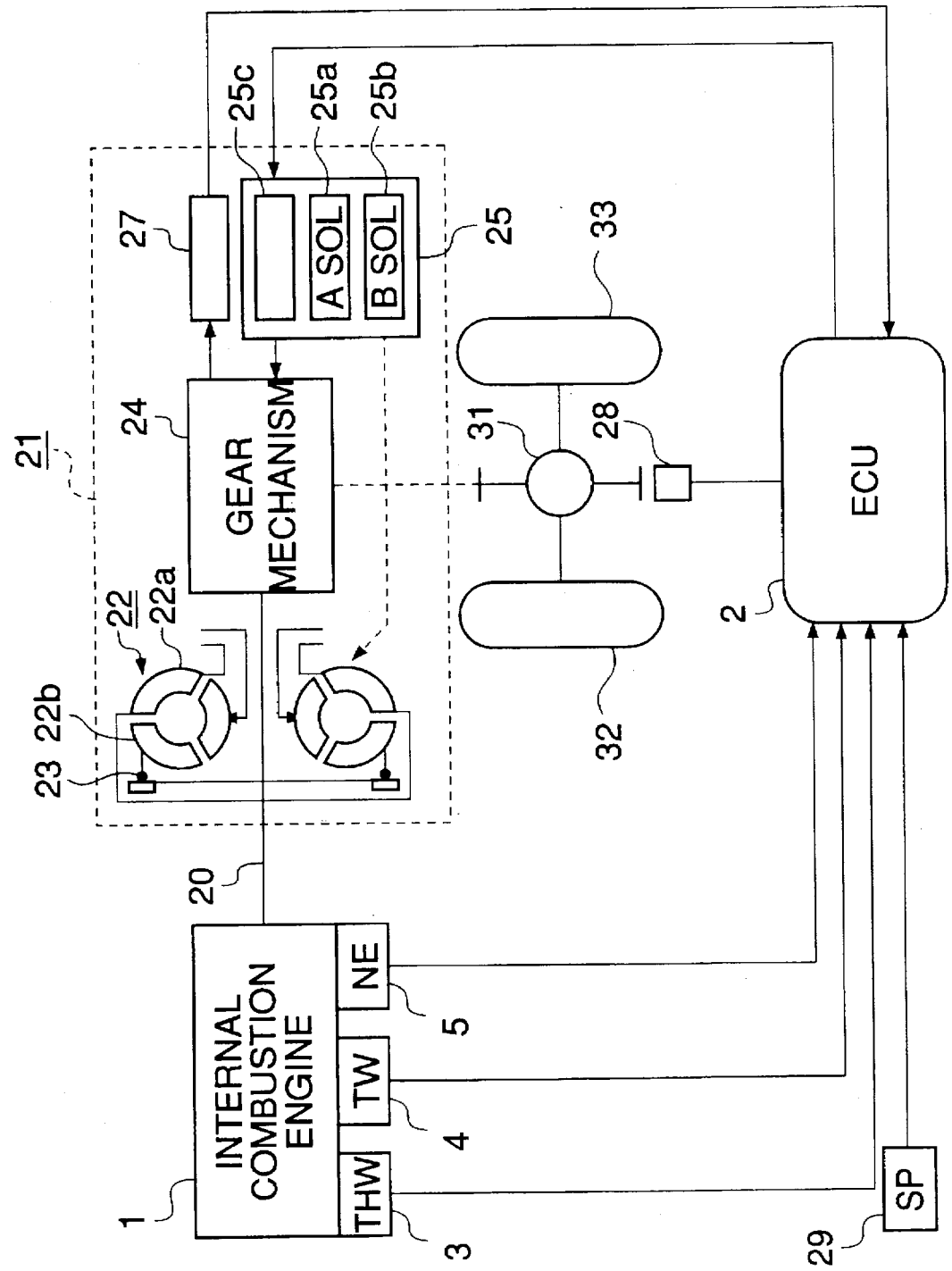
FIG. 1 is a diagram schematically showing the whole arrangement of an automotive vehicle, on which are installed an automatic transmission, a control system therefor according to an embodiment of the invention, etc.

Referring first to FIG. 1, there is shown the whole arrangement of an automotive vehicle, on which are installed an automatic transmission, a control system therefor according to an embodiment of the invention, etc. An internal combustion engine (hereinafter simply referred to as "the engine") 1 has a crankshaft 20 to which is connected an automatic transmission 21. The automatic transmission 21 is comprised of a torque converter 22 having a pump impeller 22a and a turbine runner 22b, a lock-up clutch 23 for coupling the pump impeller 22a and the turbine runner 22b together, a gear mechanism 24 connected to an output side of the torque converter 22, and a hydraulic control device 25 for controlling the operation of the lock-up clutch 23 and that of the gear mechanism 24.

The hydraulic control device 25 includes an ON-OFF type solenoid valve (hereinafter referred to as "the A solenoid valve") 25a for switching between the engagement and disengagement of the lock-up clutch 23, a duty ratio control type solenoid valve (hereinafter referred to as "the B solenoid valve") 25b for controlling the engaging force of the lock-up clutch 23 when the A solenoid valve 25a is energized or open to thereby hold the lock-up clutch 23 in engagement, and a transmission actuator 25c for controlling the gear position (i.e. change gear ratio) of the gear mechanism 24. The A solenoid valve 25a, the B solenoid valve 25b and the transmission actuator 25c are all electrically connected to an electronic control unit (hereinafter referred to as "the ECU") 2 for controlling the automatic transmission 21. The ECU 2 controls the operation of the lock-up clutch 23 by means of the A solenoid valve 25a and the B solenoid valve 25b, and at the same time controls the gear position of the gear mechanism 24 by means of the transmission actuator 25c.

Arranged in the automatic transmission 21 is a gear position sensor 27 which detects the gear position NGRAT of the gear mechanism 24, for supplying an electric signal indicative of the sensed gear position to the ECU 2.

Torque output from the engine 1 is transmitted from the crankshaft 20 through the torque converter 22, the gear mechanism 24 and a differential gear mechanism 31 to right and left drive wheels 32, 33 in the mentioned order, thereby driving these wheels. A speed sensor 28 which detects the vehicle speed VP of the automotive vehicle is arranged on an output side of the automatic transmission 21 for supplying a signal indicative of the sensed vehicle speed to the ECU 2.

The engine 1 has a throttle valve opening sensor 3 for detecting the valve opening THW of a throttle valve, not shown, arranged in an intake pipe, not shown, of the engine. The engine 1 is also provided with an engine coolant temperature sensor 4 for detecting engine coolant temperature (TW), and an engine rotational speed sensor 5 for detecting the rotational speed (NE) of the engine. Signals from these sensors are supplied to the ECU 2. The engine rotational speed sensor 5 generates a pulse (hereinafter referred to as "the TDC signal pulse") at a predetermined crank angle position of each cylinder of the engine a predetermined angle before a TDC position of the cylinder corresponding to the start of the intake stroke thereof (whenever the crankshaft 20 rotates through 180 degrees in the case of a four-cylinder engine), for supplying the TDC signal pulse to the ECU 2.

Further, a shift position sensor 29 which detects a shift lever position (hereinafter referred to as "the shift position") for selecting an operating mode of the automatic transmission is connected to the ECU 2 for supplying a signal indicative of the sensed shift position to the same. In the present embodiment, the automatic transmission is provided with D4 and D3 ranges as drive ranges. In the D4 range, the gear position is automatically selected within a range of the first speed position to the fourth speed position, and in the D3 range, the gear position is automatically selected within a range of the first speed position to the third speed position.

Further, the ECU 2 is connected to another electronic control unit, not shown, for controlling the engine 1, which controls the amount of fuel supplied to the engine 1 (i.e. valve opening periods of fuel injection valves), ignition timing, and so forth. The ECU 2 and the electronic control unit for controlling the engine 1 transmit information on control parameters to each other.

The ECU 2 is comprised of an input circuit having the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU"), a memory device comprised of a ROM storing various operational programs which are executed by the CPU and various maps, referred to hereinafter, and a RAM for storing results of calculations from the CPU, etc., and an output circuit which outputs driving signals to the A solenoid valve 25a, the B solenoid valve 25b and the transmission actuator 25c. The ECU 2 operates in response to the above-mentioned signals from the sensors to control the operation of the lock-up clutch 23 and the gear position. Routines described below with reference to flowcharts are executed by the CPU of the ECU 2.

Figure 2:
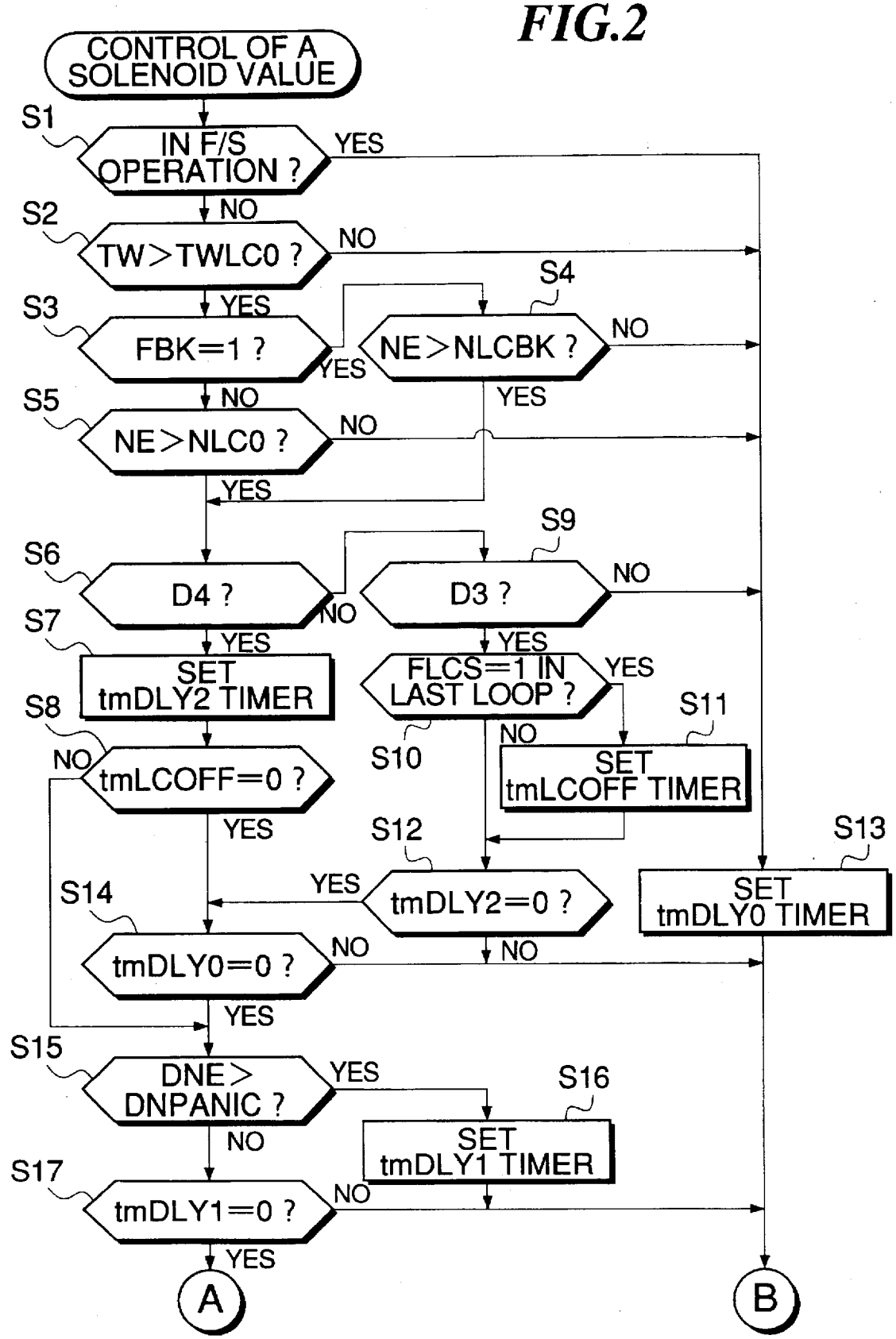
FIG. 2 is a flowchart showing a routine for carrying out ON-OFF control of a solenoid valve employed in a hydraulic control mechanism.
Figure 3:
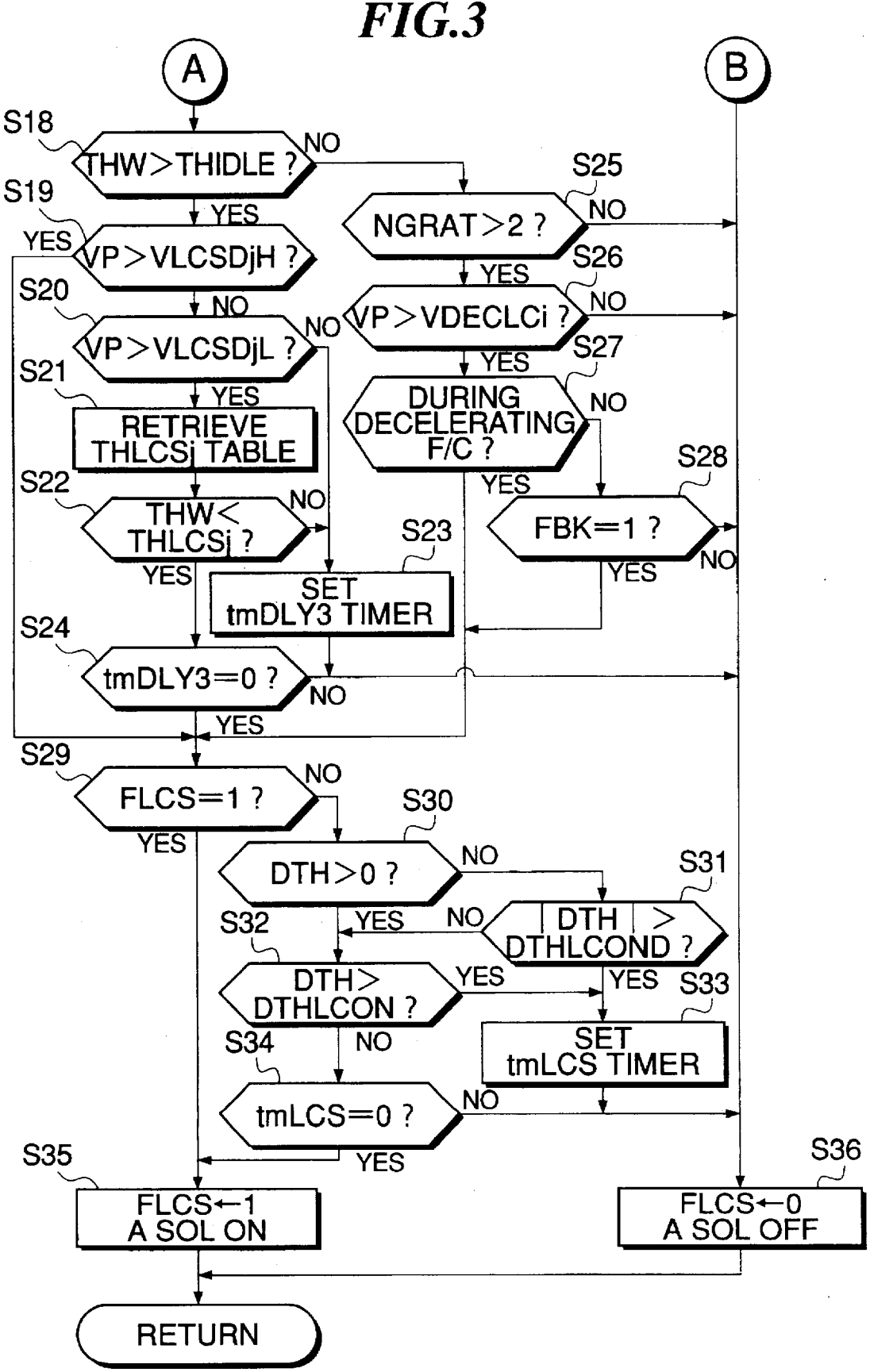
FIG. 3 is a continued part of the FIG. 2 flowchart.

FIGS. 2 and 3 shows a routine for controlling the A solenoid valve 25a, which is executed at predetermined time intervals of e.g. 80 msec. The lock-up clutch 23 is engaged when the A solenoid valve 25a is energized, and disengaged or released when the latter is deenergized.

First, at a step S1, it is determined whether or not abnormality is detected of any of the above-mentioned sensors. If no abnormality is detected, it is determined at a step S2 whether or not the engine coolant temperature TW is higher than a predetermined reference value TWLC0 (e.g. 30° C.). If abnormality of any of the sensors is detected at the step S1, or if TW≦TWLC0 holds at the step S2, the program proceeds to a step S13, wherein a tmDLY0 down-count timer (see a step S14) is set to a predetermined time period TDLY0 and started. Then, at a step S36 in FIG. 3, a lock-up flag FLCS, which, when set to "1", indicates that the engine is in an operating region for engagement of the lock-up clutch 23, is set to "0", and at the same time the A solenoid valve 25a is deenergized, followed by terminating the program.

If TW>TWLC0 holds at the step S2, it is determined at a step S3 whether or not a descent-determining flag FBK, which, when set to "1", indicates that the automotive vehicle is descending a slope, assumes "1". If the vehicle is descending a slope, the program proceeds to a step S4, wherein it is determined whether or not the engine rotational speed NE is higher than a predetermined reference value NLCBK (e.g. 860 rpm). If NE≦NLCBK holds, the program proceeds to the step S36 via the step S13 to deenergize the A solenoid valve 25a, whereas if NE>NLCBK holds, the program proceeds to a step S6.

On the other hand, if the descent-determining flag FBK assumes "0" at the step S3, which means that the vehicle is not descending a slope, the program proceeds to a step S5, wherein it is determined whether or not the engine rotational speed NE is higher than a predetermined reference value NLC0 (e.g. 1000 rpm). If NE≦NLC0 holds, the program proceeds to the step S36 via the step S13 to deenergize the A solenoid valve 25a, whereas if NE>NLC0 holds, the program proceeds to the step S6.

At the step S6, it is determined whether or not the shift position is the D4 range. If the shift position is not the D4 range, it is determined at a step S9 whether or not it is the D3 range. If the shift position is neither the D4 range nor the D3 range, the program proceeds to the step S36 via the step S13, whereby the A solenoid valve 25a is deenergized.

If the shift position is determined to be the D3 range at the step S6, it is determined at a step S10 whether or not the lock-up flag FLSC assumed "1" in the immediately preceding loop. If the lock-up flag FLSC assumed "0", the program immediately proceeds to a step S12. If the lock-up flag FLSC assumed "1", a tmLCOFF downcount timer is set to a predetermined time period TLCOFF and started at a step S11, followed by the program proceeding to the step S12. At the step S12, it is determined whether or not the count tmDLY2 of a tmDLY2 downcount timer which is set at a step S7, referred to hereinafter, is equal to "0". The count tmDLY2 is larger than 0 immediately after the shift position is changed from the D4 range to the D3 range, so that the program proceeds to the step S36, and when tmDLY2 becomes equal to 0, the program proceeds to a step S14.

On the other hand, if the shift position is in the D4 range at the step S6, the program proceeds to the step S7, wherein the tmDLY2 downcount timer is set to a predetermined time period TDLY2 and started. Then at the following step S8, it is determined whether or not the count tmLCOFF of the tmLCOFF downcount timer set at the step S11 is equal to "0". If the tmLCOFF downcount timer was set and started at the step S11 B when the shift position was the D3 range, the count tmLCOFF is larger than "0" when the step S8 is executed for the first time thereafter, so that the program immediately proceeds to a step S15. If the count tmLCOFF is equal to 0, the program proceeds to the step S14, wherein it is determined whether or not the count tmDLY0 of the tmDLY0 downcount timer set at the step S13 is equal to "0". As long as tmDLY0>0 holds, the program proceeds to the step S36, whereby the A solenoid valve 25a is deenergized.

If the count tmDLY0 becomes equal to "0" at the step S14, the program proceeds to the step S15, wherein it is determined whether or not a decreasing amount DNE of the engine rotational speed NE (=NE (n−1)−NE (n)) is larger than a predetermined value DNPANIC (e.g. corresponding to a case in which the engine rotational speed NE decreases by 200 rpm within 80 msec). If DNE>DNPANIC holds, i.e. if the decreasing amount of the engine rotational speed NE is large, a tmDLY1 downcount timer is set to a predetermined time period TDLY1 and started at a step S16, followed by the program proceeding to the step S36.

If DNE≦DNPANIC holds at the step S15, i.e. if the decrement of the NE value is small, it is determined at a step S17 whether or not the count tmDLY1 of the tmDLY1 downcount timer set at the step S16 is equal to "0". As long as tmDLY1>0 holds, the program proceeds to the step S36, and when the count tmDLY1 becomes equal to "0", the program proceeds to a step S18 in FIG. 3.

At the step S18, it is determined whether or not the throttle valve opening THW is larger than a predetermined reference value THIDLE with reference to which the engine is determined to be idling. If THW≦THIDLE holds, it is determined at a step S25 whether or not the gear position NGRAT is a higher speed position than the second speed position (i.e. the third speed position or the fourth speed position). If NGRAT≦2 holds, which means that the gear position is the first or the second speed position, the program proceeds to the step S36, whereby the A solenoid valve 25a is deenergized.

If NGRAT>2 holds at the step S25, which means that the gear position is the third or the fourth speed position, it is determined at a step S26 whether or not the vehicle speed VP is higher than a predetermined reference value VDECLCi (e.g. 38 km/h). The suffix "i" indicates that a different value is used depending on the gear position. That is, when the gear position is the third speed position, a predetermined reference value VDECLC3 for the third speed position is used, and when the gear position is the fourth speed position, a predetermined reference value VDECLC4 for the fourth speed position is used. If VP≦VDECLCi holds at the step S26, the program proceeds to the step S36, whereas if VP>VDECLCi holds, it is determined at a step S27 whether or not decelerating fuel cut is being carried out. If decelerating fuel cut is being carried out, the program immediately proceeds to a step S29, whereas if decelerating fuel cut is not being carried out, it is determined at a step S28 whether or not the descent-determining flag FBK assumes "1". If the flag FBK assumes "0", which means that the vehicle is not descending a slope, the program proceeds to the step S36, whereas if the flag FBK assumes "1", which means that the vehicle is descending a slope, the program proceeds to the step S29. This makes it possible to enlarge the operating region of the engine in which the lock-up clutch is engaged, when the vehicle is descending a slope.

On the other hand, if THW>THIDL holds at the step S18, it is determined at a step S19 whether or not the vehicle speed VP is higher than a predetermined reference value VLCSDjH (e.g. 100 km/h) for the higher speed positions. If VP≦VLCSDjH holds, it is determined at a step S20 whether or not the vehicle speed VP is higher than a predetermined reference value VLCSDjL (e.g. 20 km/h) for the lower speed positions. The suffix "j" indicates that a different value is used depending on whether the shift position is the D3 range or the D4 range. That is, when the shift position is the D3 range, predetermined reference values VLCSD3H and VLCSD3L are used, whereas when the shift position is the D4 range, predetermined reference values VLCSD4H and VLCSD4L are used.

Figure 4:
FIG. 4 shows a table for use in calculating a predetermined reference value THLCSj of throttle valve opening at a step S21 in FIG. 3.

If VP>VLCSDjH holds at the step S19, the program immediately proceeds to the step S29. If VP≦VLCSDj L holds at the step S20, a tmDLY3 downcount timer is set to a predetermined time period TDLY3 and started at a step S23, followed by the program proceeding to the step S36. On the other hand, if VLCSDjL<VP≦VLCSDjH holds at the step S20, the program proceeds to a step S21, wherein a predetermined reference value THLCSj of the throttle valve opening to be used at a step S22 is calculated by retrieving a THLCSj table according to the vehicle speed VP. The THLCSj table is set, as shown in FIG. 4, such that the predetermined reference value THLCSj becomes larger as the vehicle speed VP increases. The suffix "j" indicates that different tables are provided for the D3 and D4 ranges, respectively, i.e. that a corresponding table is used depending on the shift position. However, the tables are set in a similar manner, as shown in FIG. 4, for both of the D3 range and the D4 range.

At the following step S22, it is determined whether or not the throttle valve opening THW is smaller than the predetermined reference value THLCSj. If THW≧THLCSj holds, the program proceeds to the step S23, whereas if THW<THLCSj holds, the program proceeds to a step S24, wherein it is determined whether or not the count tmDLY3 of the tmDLY3 downcount timer set at the step S23 is equal to "0". As long as tmDLY3>0 holds, the program proceeds to the step S36, and when the count tmDLY3 becomes equal to "0", the program proceeds to the step S29.

At the step S29, it is determined whether or not the lock-up flag FLCS assumes "1". If the flag FLCS assumes "1", the program immediately proceeds to a step S35, wherein the A solenoid valve 25a is kept energized.

On the other hand, if the flag FLCS assumes "0" at the step S29, it is determined at a step S30 whether or not an amount of change DTH (=THW (n)–THW (n–1)) in the throttle valve opening THW is larger than "0". If DTH≦0 holds, it is determined at a step S31 whether or not the absolute value |DTH| of the amount of change DTH is larger than a first predetermined reference value DTHLCOND. If |DTH|>DTHLCOND holds, which means that the amount of change in the throttle valve opening in a closing direction is large, a tmLCS downcount timer is set to a predetermined time period TLCS and started at a step S33, followed by the program proceeding to the step S36.

If DTH>0 holds at the step S30, or if |DTH|≦DTHLCOND holds at the step S31, it is determined at a step S32 whether or not the amount of change DTH is larger than a second predetermined reference value DTHLCON which is larger than the first predetermined reference value DTHLCOND. If DTH>DTHLCON holds, the program proceeds to the step S33, whereas if DTH≦DTHLCON holds, it is determined at a step S34 whether or not the count tmLCS of the tmLCS downcount timer is equal to "0". As long as tmLCS>0 holds, the program proceeds to the step S36, and when the count tmLCS becomes equal to "0", the program proceeds to the step S35, wherein the lock-up flag FLCS is set to "1", and at the same time the A solenoid valve 25a is energized.

As described above, according to the routine shown in FIGS. 2 and 3, when abnormality is detected of any related sensor, when the engine coolant temperature TW is low, or when the engine rotational speed NE is low (as determined at the steps S1, S2, and S5, respectively), the A solenoid valve 25a is deenergized (i.e. the lock-up clutch is disengaged) regardless of the other conditions. In cases other than the above, whether the A solenoid valve 25a should be energized or deenergized (i.e. whether the lock-up clutch should be engaged or disengaged) is determined depending on the shift position, the gear position, the throttle valve opening THW, the amount of change DTH in the throttle valve opening THW, the vehicle speed VP, and whether the vehicle is descending a slope.

Figure 5:
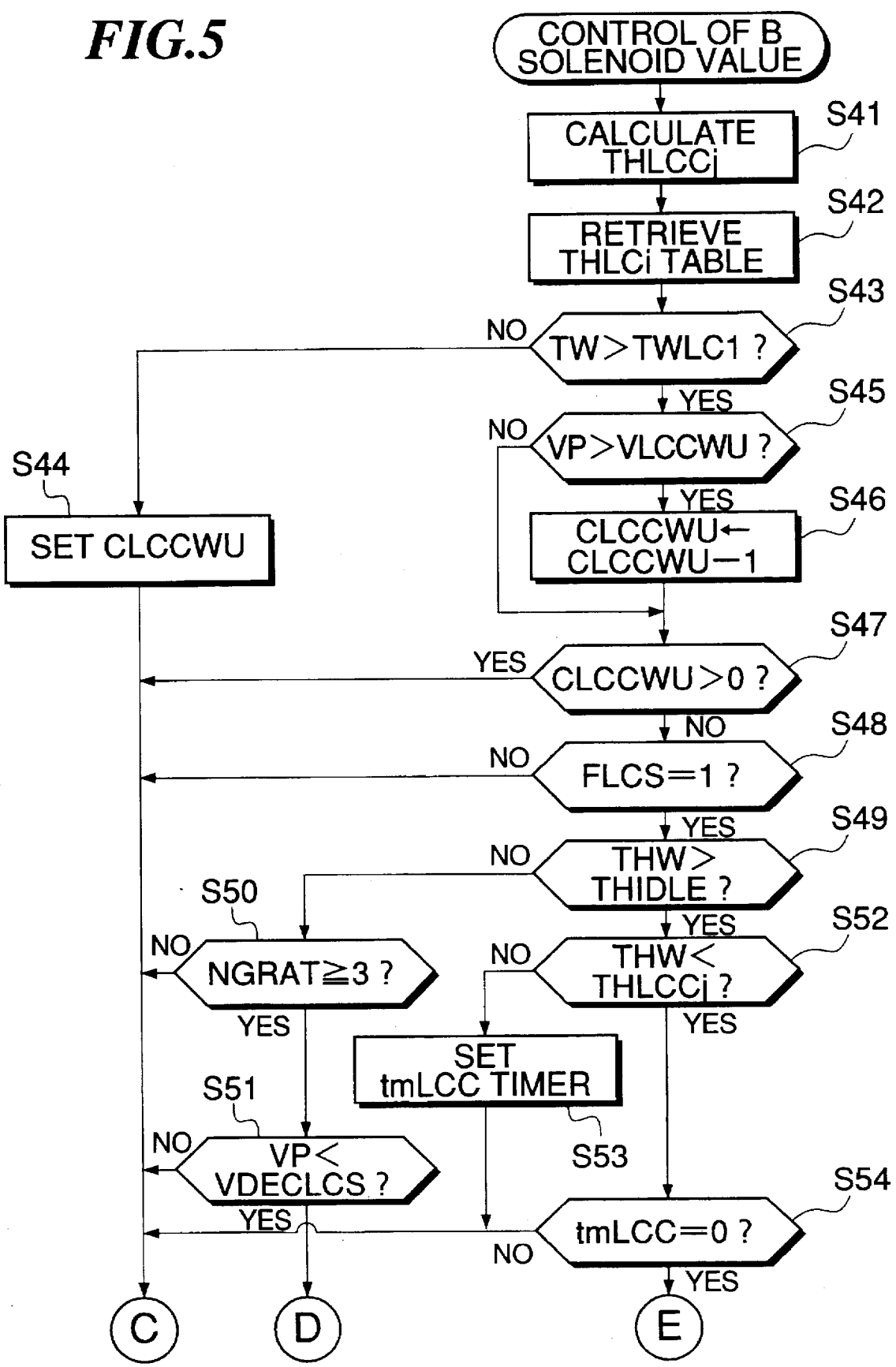
FIG. 5 is a flowchart showing a routine for carrying out duty ratio control of a solenoid valve employed in the hydraulic control mechanism.
Figure 6:
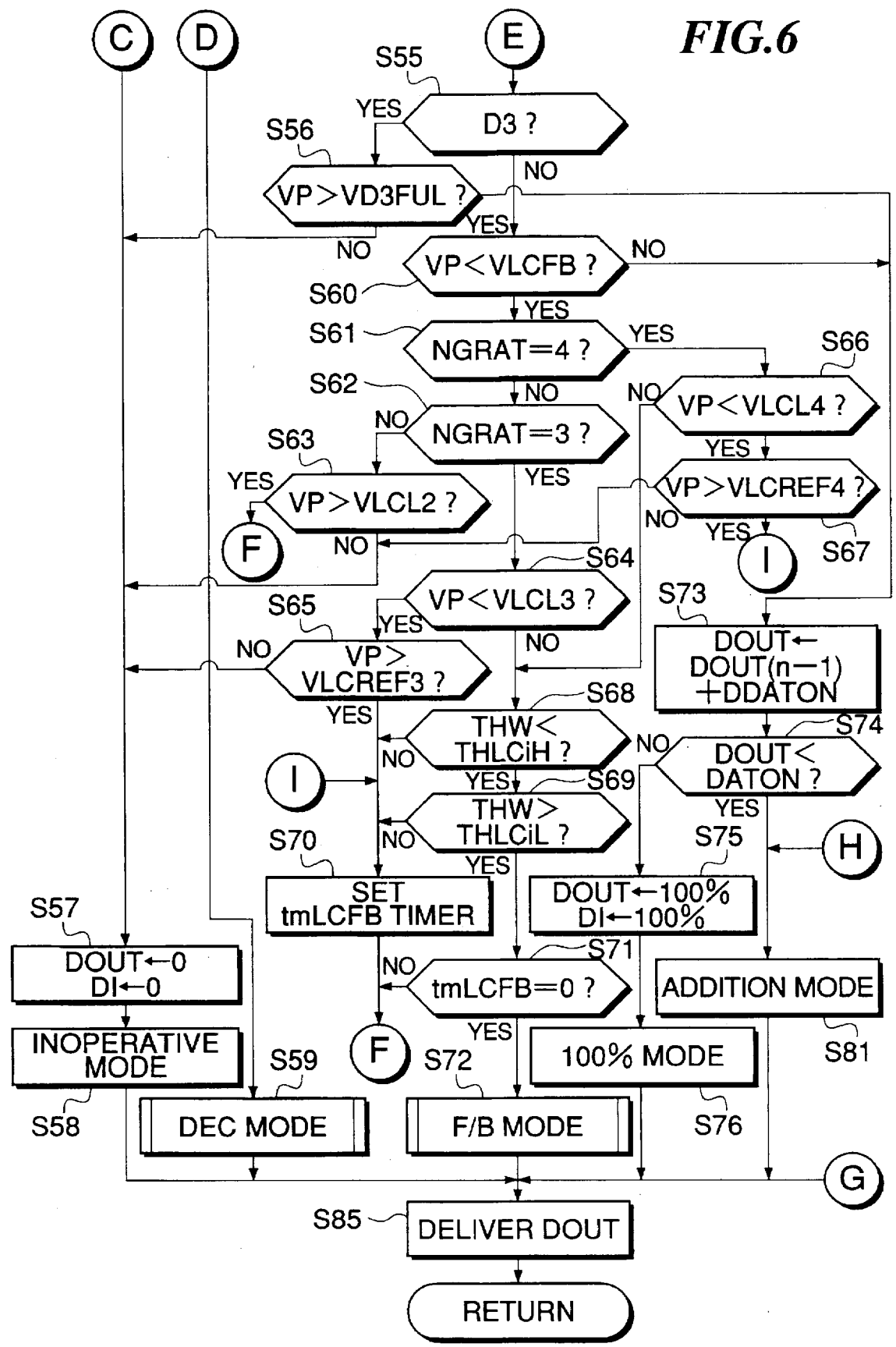
FIG. 6 is a continued part of the FIG. 5 flowchart.
Figure 7:
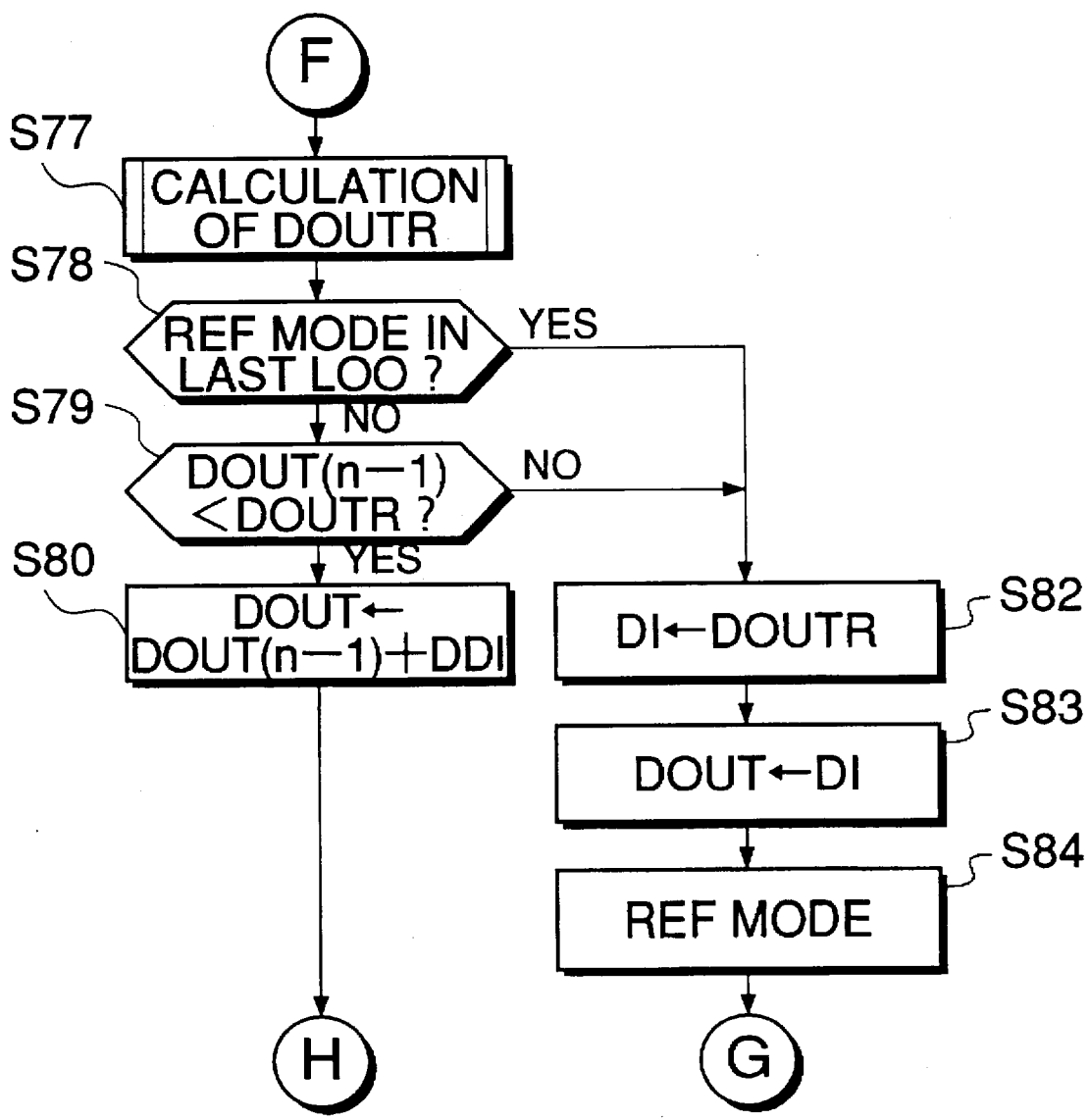
FIG. 7 is a continued part of the FIG. 6 flowchart.

FIGS. 5 to 7 show a routine for carrying out duty ratio control of the B solenoid valve 25b, which is executed at predetermined time intervals of e.g. 80 msec, similarly to the routine shown in FIGS. 2 and 3.

First, at a step S41, a predetermined reference value THLCCj of the throttle valve opening THW to be used in determination at a step S52, referred to hereinafter, is calculated by the use of the following equation (1):

$$THLCCj=THLCSj-DTHLC \quad (1)$$

where THLCSj represents the predetermined reference value calculated at the step S21 in FIG. 3, and DTHLC a subtrahend term calculated based on the vehicle speed VP. The suffix "j" used herein indicates that a different value is used depending on the selected shift position (i.e. whether it is the D3 range or the D4 range).

Figure 8:
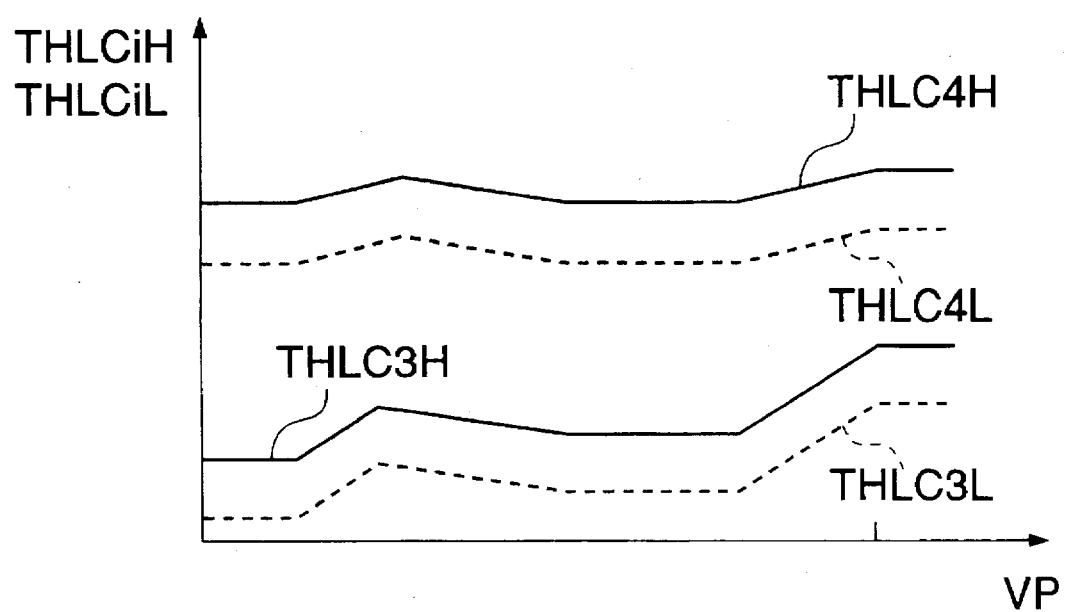
FIG. 8 shows a table for use in calculating a predetermined high load-side reference value THLCiH and a predetermined low load-side reference value THLCiL at a step S42 in FIG. 5.

At the following step S42, a predetermined high load-side reference value THLCiH and a predetermined low load-side reference value THLCiL of the throttle valve opening THW, which are to be used at respective steps S68 and S69 in FIG. 6, referred to hereinafter, are calculated by retrieving a THLCi table shown in FIG. 8 according to the vehicle speed VP. The THLCi table is set such that the THLCi value becomes larger as the vehicle speed VP increases. The suffix "i" indicates that a different value is used depending on whether the gear position is the third speed position or the fourth speed position. As shown in FIG. 8, THLC4H is larger than THLC3H, and THLC4L is larger than THLC3L.

At the following step S43, it is determined whether or not the engine coolant temperature TW is higher than a predetermined reference value TWLC1 (e.g. 30° C.). If TW≦TWLC1 holds, a CLCCWU downcounter, the count CLCCWU of which is decremented at a step S46, referred to hereinafter, and used at a step S47, referred to hereinafter, is set to a predetermined value C0 at a step S44, followed by the program proceeding to a step S57 in FIG. 6. At the step S57, a control duty ratio DOUT for controlling the B solenoid valve 25b and an integral term DI applied in calculation of the DOUT value in a deceleration mode (hereinafter referred to as "the DEC mode) and a feedback control mode (hereinafter referred to as "the F/B mode) of the duty ratio control, which will be described hereinafter, are both set to "0". At the following step S58, the duty ratio control is set to an inoperative mode in which the lock-up clutch 23 is practically disengaged. Then, the program proceeds to a step S85, wherein a control signal indicative of the control duty ratio DOUT is delivered to the B solenoid valve 25b, followed by terminating the program.

If TW>TWLC1 holds at the step S43, it is determined at a step S45 whether or not the vehicle speed VP is higher than a predetermined reference value LCCWU (e.g. 35 km/h). If VP≦LCCWU holds, the program immediately proceeds to a step S47, whereas if VP>LCCWU holds, the count CLCCWU of the CLCCWU downcounter is decremented by "1", and then the program proceeds to the step S47. At the step S47, it is determined whether or not the count CLCCWU is larger than "0". As long as CLCCWU>0 holds, the program proceeds to the step S57, whereas if the count CLCCWU is equal to or smaller that "0", it is determined at a step S48 whether or not the lock-up flag FLCS assumes "1". If the flag FLCS assumes "0", the program proceeds to the step S57, wherein the duty ratio control is set to the inoperative mode.

If the flag FLCS assumes "1" at the step S48, it is determined at a step S49 whether or not the throttle valve opening THW is larger than the predetermined reference value THIDLE for determining the idling of the engine. If THW≦THIDLE holds, the program proceeds to a step S50, wherein it is determined whether or not the gear position NGRAT is set to the third or higher speed position. If NGRAT≧3 holds, it is determined at a step S51 whether or not the vehicle speed VP is lower than a predetermined reference value VDECLCS (e.g. 70 km/h). If NGRAT<3 holds at the step S50, or if VP≧VDECLCS holds at the step S51, the program proceeds to the step S57, wherein the duty ratio control is set to the inoperative mode. On the other hand, if NGRAT≧3 and at the same time VP<VDECLCS hold, the control duty ratio DOUT is determined by executing the duty ratio control in the DEC mode at a step S59, which will be described hereinafter, followed by the program proceeding to the step S85.

If THW>THIDLE holds at the step S49, it is further determined at a step S52 whether or not the throttle valve opening THW is smaller than the predetermined reference value THLCCj calculated at the step S41. If THW≧THLCCj holds, a tmLCC downcount timer is set to a predetermined time period TLCC and started at a step S53, followed by the program proceeding to the step S57 (inoperative mode).

If THW<THLCCj holds at the step S52, it is determined at a step S54 whether or not the count tmLCC of the tmLCC downcount timer set at the step S53 is equal to "0". As long as tmLCC>0 holds, the program proceeds to the step S57, and when the count tmLCC becomes equal to "0", the program proceeds to a step S55 in FIG. 6.

At the step S55, it is determined whether or not the shift position is the D3 range. If the shift position is the D3 range, it is determined at a step S56 whether or not the vehicle speed VP is higher than a predetermined reference value VD3FUL (e.g. 130 km/h). If VP≦VD3FUL holds, the program proceeds to the step S57 (inoperative mode), whereas if VP>VD3FUL holds, the program proceeds to a step S73, wherein the control duty ratio DOUT is calculated by the use of the following equation (2):

$$DOUT=DOUT(n-1)+DDATON \quad (2)$$

wherein DOUT(n-1) represents the immediately preceding value of the control duty ratio DOUT, and DDATON a predetermined addend term.

At the following step S74, it is determined whether or not the DOUT value is smaller than the predetermined reference value DATON. If DOUT<DATON holds, at a step S81 the duty ratio control is set to an addition mode in which the DOUT value is gradually increased according to the result of the calculation carried out at the step S73, followed by the program proceeding to the step S85.

On the other hand, if DOUT≧DATON holds at the step S74, the program proceeds to a step S75, wherein the control duty ratio DOUT and the integral term DI are both set to 100% (i.e. the maximum engaging force), and then the duty ratio control is set to a 100% mode at a step S76, followed by the program proceeding to the step S85.

Further, if the shift position is not the D3 range at the step S55, the program proceeds to a step S60, wherein it is determined whether or not the vehicle speed VP is lower than a predetermined reference value VLCFB (e.g. 60 km/h). If VP≧VLCFB holds, the program proceeds to the step S73, whereas if VP<VLCFB holds, it is determined at steps S61 and S62 whether or not the gear position NGRAT is the fourth speed position and whether or not it is the third speed position, respectively. According to results of these determinations, the following processing is carried out:

(1) When the gear position NGRAT is the fourth speed position

It is determined at steps S66 and S67 whether or not the vehicle speed VP is lower than a predetermined reference value VLCL4 (e.g. 40 km/h) and higher than a predetermined reference value VLCREF4 (e.g. 20 km/h), respectively. If VP≦VLCREF4 holds at the step S67, the program proceeds to the step S57 (inoperative mode), whereas if VLCREF4<VP<VLCL4 holds at the steps S66 and S67, the program proceeds to a step S70, whereas if VP≧VLCL4 holds at the step S66, the program proceeds to the step S68.

Next, a processing to be executed at the step S70 et seq. will be described.

Figure 11:
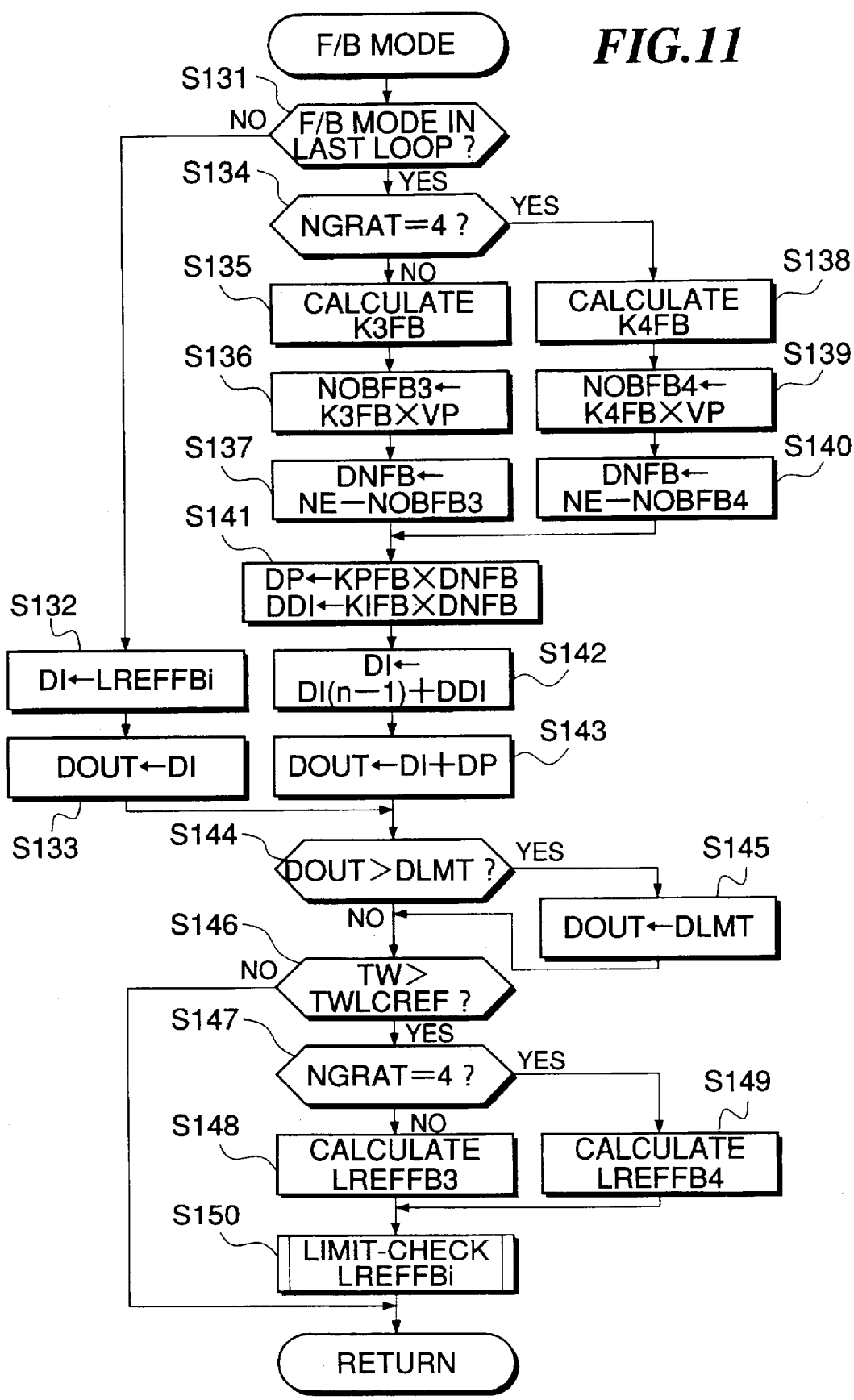
FIG. 11 is a flowchart showing a subroutine for carrying out a feedback mode (F/B mode) processing, which is executed at a step S72 in FIG. 6.

At the step S70, a tmLCFB downcount timer used at a step S71, referred to hereinafter, is set to a predetermined time period TLCFB and started, and then the program proceeds to a step S77 in FIG. 7, wherein calculation of a learned control amount DOUTR, described in detail hereinafter with reference to FIG. 11, is carried out. Then, it is determined at a step S78 whether or not the duty ratio control was executed in a learning mode (hereinafter referred to as "the REF mode") in which the learned control amount DOUTR is applied, in the immediately preceding loop. If the duty ratio control was not executed in the REF mode, it is determined at a step S79 whether or not the immediately preceding value DOUT(n-1) of the control duty ratio is smaller than the learned control amount DOUTR, whereas if the duty ratio control was executed in the REF mode in the immediately preceding loop, or if DOUT(n-1)≧DOUTR holds, the integral term DI is set to the learned amount DOUTR at a step S82, and the control duty ratio DOUT is set to the resulting integral term DI at a step S83. Then, the duty ratio control is set to the REF mode at a step S84, followed by the program proceeding to the step S85.

If DOUT(n-1)<DOUTR holds at the step S79, the control duty ratio DOUT is calculated at a step S80 by the use of the following equation (3):

$$DOUT=DOUT(n-1)+DDI \quad (3)$$

where DDI is a predetermined addend term. Then, the duty ratio control is set to the addition mode at a step S81, followed by the program proceeding to the step S85.

Next, a processing to be executed at the step S68 et seq. will be described.

Figure 10:
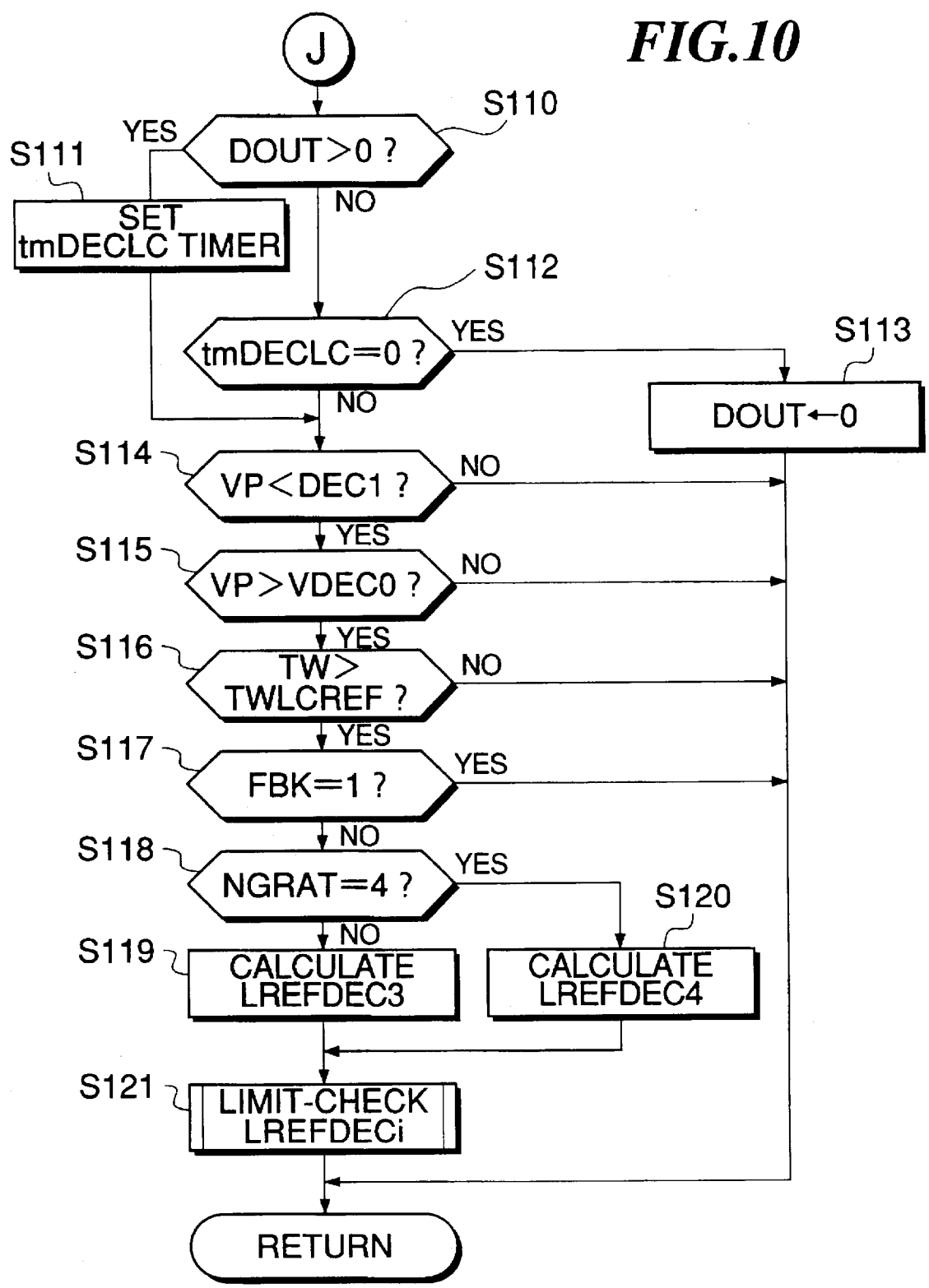
FIG. 10 is a continued part of the FIG. 9 flowchart.

At the steps S68 and S69, it is determined whether or not the throttle valve opening THW is smaller than the predetermined high load-side reference value THLCiH and whether or not the same is larger than the predetermined low load-side reference value THLCiL, respectively. These reference values THLCiH and THLCiL are calculated at the step S42. If THW≧THLCiH holds at the step S68 or if THW≦THLCiL holds at the step S69, the program proceeds to the step S70 (REF mode or addition mode), whereas if THLCiL<THW<THLCiH holds, it is determined at the step S71 whether or not the count tmLCFB of the tmLCFB downcount timer set at the step S70 is equal to "0". As long as tmLCFB>0 holds, the program proceeds to the step S77 (REF mode or addition mode), and when the count tmLCFB becomes equal to "0", calculation of the DOUT value, which will be described hereinafter with reference to FIG. 10, is carried out in the F/B mode at a step S72, followed by the program proceeding to the step S85.

(2) When the gear position NGRAT is the third speed position (NGRAT=3 holds at the step S62)

It is determined at steps S64 and S65 whether or not the vehicle speed VP is lower than a predetermined reference value VLCL3 (e.g. 30 km/h), and whether or not it is higher than a predetermined reference value VLCREF3 (e.g. 20 km/h), respectively. If VP≦VLCREF3 holds at the step S65, the program proceeds to the step S57 (inoperative mode), whereas if VLCREF3<VP<VLCL3 holds at the steps S64 and S65, the program proceeds to the step S70 (REF mode or addition mode). Further, if VP≧VLCL3 holds at the step S64, the program proceeds to the step S68 (F/B mode, REF mode or addition mode).

(3) When the gear position NGRAT is the first speed position or the second speed position (NGRAT=3 does not hold at the step S62)

It is determined at a step S63 whether or not the vehicle speed VP is higher than a predetermined reference value VLCL2 (e.g. 20 km/h). If VP≦VLCL2 holds at the step S63, the program proceeds to the step S57 (inoperative mode), whereas if VP>VLCL2 holds, the program proceeds to the step S77 (REF mode or addition mode). It should be noted that VP>VLCL2 holds exclusively when the gear position is the second speed position.

As described above, according to the routine in FIGS. 5 to 7, when the engine coolant temperature TW is low (i.e. when TW≦TWLC1 holds at the step S43), or when the A solenoid valve 25a is not energized (i.e. when the lock-up flag FLCS assumes "0" at the step S48), the duty ratio control is set to the inoperative mode at the step S58, regardless of the other conditions. In cases other than the above, one of the inoperative mode, the DEC mode, the F/B mode, the 100% mode, the addition mode and the REF mode is selected depending on the vehicle speed VP, the throttle valve opening THW, the gear position NGRAT and the shift position, to thereby determine the control duty ratio DOUT for the B solenoid valve 25b.

Figure 9:
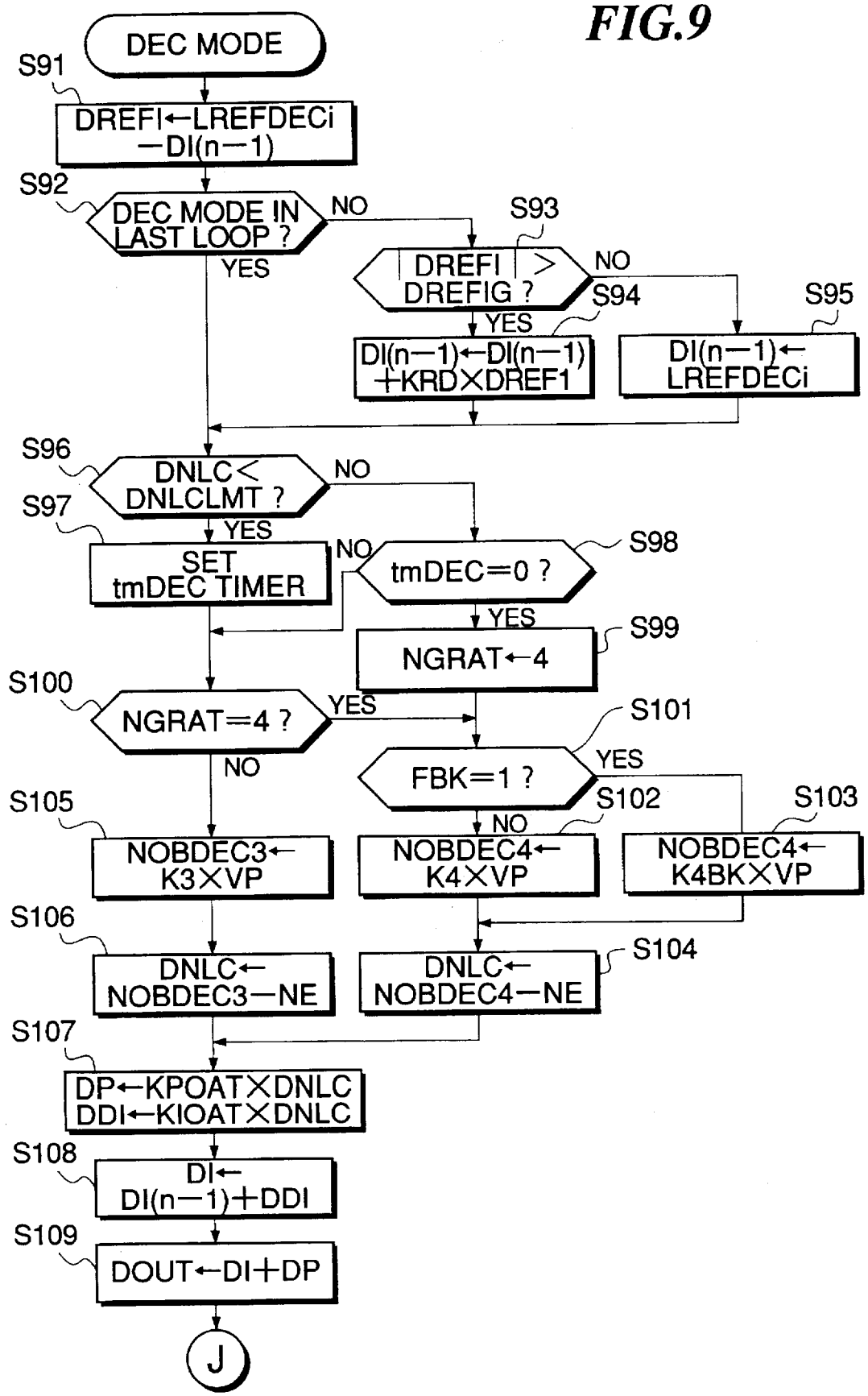
FIG. 9 is a flowchart showing a subroutine for carrying out a deceleration mode (DEC mode) processing, which is executed at a step S59 in FIG. 6.

FIGS. 9 and 10 show a subroutine for carrying out the duty ratio control in the DEC mode, which is executed at the step S59 in FIG. 6.

First, at a step S91, a difference DREFI between a learned value LREFDECi (i=3 or 4, and the numbers 3 and 4 correspond to the third speed position and the fourth speed position, respectively) in the DEC mode and the immediately preceding value DI(n−1) of the integral term DI is calculated. Then, it is determined at a step S92 whether or not the duty ratio control was executed in the DEC mode in the immediately preceding loop. The learned value LREFDECi is initially set to a predetermined value.

If the duty ratio control was executed in the DEC mode in the immediately preceding loop, the program jumps to a step S96, whereas if the duty ratio control was not executed in the DEC mode, it is determined at a step S93 whether or not the absolute value |0DREFI| of the difference DREFI calculated at the step S91 is larger than a predetermined reference value DREFIG. If |DREFI|≦DREFIG holds, the immediately preceding value DI(n−1) of the integral term DI to be applied at a step S108, referred to hereinafter, is replaced with the learned value LREFDECi at a step S95, whereas if |0DREFI|>DREFIG holds, the program proceeds to a step S94, wherein the immediately preceding value Di(n−1) of the integral term DI is updated by the use of the following equation (4):

$$DI(n-1)=DI(n-1)+KRD \times DREFI \tag{4}$$

where KRD represents a predetermined value which is set to a different value depending on whether the DREFI value is positive or negative, e.g. set to 0.5 or a value close thereto. Then the program proceeds to the step S96.

At the step S96, it is determined whether or not a difference DNLC (calculated in the immediately preceding loop) between a desired value NOBDECi of the engine rotational speed and the detected value of the engine rotational speed NE (see steps S104 and S106) is smaller than a predetermined reference value DNLCLMT. if DNLC<DNLCLMT holds, a tmDEC downcount timer is set to a predetermined time period TDEC and started at a step S97, and then the program proceeds to a step S100, wherein it is determined whether or not the gear position NGRAT is the fourth speed position. If the gear position NGRAT is the fourth speed position, the program proceeds to a step S101, whereas if the gear position NGRAT is not the fourth speed position, it is judged that the gear position is the third speed position (see the step S50 in FIG. 5), and then the program proceeds to steps S105 and S106, wherein a desired engine rotational speed value NOBDEC3 is set, and the difference DNLC is calculated by the use of the following equations (5) and (6), respectively:

$$NOBDEC3=K3 \times VP \tag{5}$$

$$DNLC=NOBDEC3-NE \tag{6}$$

where K3 represents a coefficient which converts the vehicle speed VP to such an engine rotational speed value that a slip ratio ETR of the lock-up clutch 23 becomes equal to approximately 102%. The slip ratio ETR is defined by the following equation (7):

$$ETR=NM/NE \tag{7}$$

where NM represents an input rotational speed of the gear mechanism 24. ETR>100% indicates that it is desired that an input rotational speed NM of the gear mechanism 24 should be higher than the engine rotational speed NE.

If DNLC≦DNLCMT holds at the step S96, which means that the difference DNLC is large, it is determined at a step S98 whether or not the count tmDEC of the tmDEC downcount timer set at the step S97 is equal to "0". As long as tmDEC>0 holds, the program proceeds to the step S100, and when the count tmDEC becomes equal to "0", the program proceeds to a step S99, wherein the gear position NGRAT is set to the fourth speed position, and it is determined at the step S101 whether or not the descent-determining flag FBK assumes "1". If the flag FBK assumes 0, which means that the vehicle is not descending a slope, a desired engine rotational speed value NOBDEC4 is calculated at a step S102 by the use of the following equation in which a coefficient K4 is used:

$$NOBDEC4=K4 \times VP \tag{8}$$

where K4 is set such that the slip ratio ETR becomes equal to e.g. 104%.

On the other hand, if the flag FBK assumes 1, which means that the vehicle is descending a slope, the desired engine rotational speed value NOBDEC4 is calculated at a step S103 by the use of the following equation (9) in which a coefficient K4BK is used:

$$NOBDEC4=K4BK \times VP \tag{9}$$

where K4BK is set such that the slip ratio ETR becomes equal to e.g. 106% (i.e. K4BK>K4 holds).

From the step S102 or S103, the program proceeds to a step S104, wherein the difference DNLC is calculated by the use of the following equation (10):

$$DNLC=NOBDEC4-NE \tag{10}$$

At the following step S107, a proportional term DP and an addend term DDI are calculated respectively by the use of the following equations (11) and (12):

$$DP=KPOAT \times DNLC \tag{11}$$

$$DDI=KIOAT \times DNLC \tag{12}$$

where KPOAT and KIOA represent predetermined coefficients.

Then, at steps S108 and S109, the integral term DI and the control duty ratio DOUT are calculated respectively by the use of the following equations (13) and (14) by applying the values calculated at the step S107 thereto:

$$DI=DI(n-1)+DDI \tag{13}$$

$$DOUT=DI+DP \tag{14}$$

Then, the program proceeds to a step S110 in FIG. 10.

At the step S110 in FIG. 10, it is determined whether or not the DOUT value calculated at the step S109 is larger than "0". If DOUT>0 holds, a tmDECLC downcount timer is set to a predetermined time period TDECLC and started at a step S111, followed by the program proceeding to a step S114. On the other hand, if DOUT≦0 holds, it is determined at a step S112 whether or not the count tmDECLC of the tmDECLC downcount timer set at the step Sill is equal to "0". As long as tmDECLC>0 holds, the program proceeds to the step S114, and when the count tmDECLC becomes equal to "0", the program proceeds to a step S113, wherein the DOUT value is set to "0", followed by immediately terminating the program.

At the step S114, it is determined whether or not the vehicle speed VP is lower than a predetermined reference value VDEC1. If VP<VDEC1 holds, it is further determined at a step S115 whether or not the vehicle speed VP is higher than a predetermined reference value VDEC0 (<VDEC1). If VDEC0<VP<VDEC1 holds, it is determined at a step S116 whether or not the engine coolant temperature TW is higher than a predetermined reference value TWLCREF (e.g. 75° C.). If TW>TWLCREF holds, it is determined at a step S117 whether or not the descent-determining flag FBK assumes "1".

If any of the answers to the questions of the steps S114 to S116 is negative (NO) or if the answer to the question of the step S117 is affirmative (YES), i.e. if VP≥VPDEC1, VP≤VDEC0, TW≤TWLCREF or FBK=1 holds, the program is immediately terminated without calculating any learned value. If the flag FBK assumes 0 at the step S117, it is determined at a step S118 whether or not the gear position is the fourth speed position. Then, depending on the gear position (i.e. whether the gear position is the third speed position or the fourth speed position), a learned value LREFDECi is calculated at a step S119 or S120 by the use of the following equation (15):

$$LREFDECi = CREFDEC \times DOUT/A + (A-CREFDEC) \times LREFDECi(n-1)/A \quad (15)$$

where the symbol "A" represents a constant set e.g. to 1000 (hexadecimal), and CREFDEC is an averaging coefficient set to a value between 1 and A, and then limit-checking is carried out at a step S121, followed by terminating the program.

The limit-checking is carried out to confine the learned value LREFDECi within a range defined by predetermined upper and lower limit values, i.e. to set the same to the predetermined upper or lower limit value, when the LREFDECi value falls out of the range.

As described above, according to the routine shown in FIGS. 9 and 10, the DOUT value is determined at the steps S100 to S109 such that the slip ratio ETR becomes equal to a desired value of more than 100% (i.e. NM>NE) in the DEC mode, and at the same time the learned value LREFDECi is calculated for each gear position at the step S119 or S120. The learned value LREFDECi is used at the step S94 or S95 as an initial value of the integral term DI immediately after transition of the processing to the DEC mode.

Further, the desired engine rotational speed is set at the steps S101 and S103 such that it increases when the vehicle is descending a slope, whereby the difference DNLC is increased at the step S104 to increase the control duty ratio DOUT, thereby increasing the engaging force of the lock-up clutch. This makes it possible to more effectively apply engine brake. The descent-detecting method according to the embodiment makes it possible to detect traveling on a gentle and long descent which the prior art could not detect, as will be described hereinafter. Therefore, engine brake can be effectively applied while the vehicle is descending such a gentle and long slope, as well. Further, when the engine rotational speed NE exceeds a predetermined reference value under these traveling conditions of the vehicle, it is normally determined that the engine is in a fuel cut region, which enables fuel cut to be carried out with an increase in the engine rotational speed, thereby also attaining reduced fuel consumption.

Further, if the engine coolant temperature TW is determined to be low (i.e. TW≤TWLCREF holds) at the step S116, calculation of the learned value at the step S119 or S120 is inhibited, which means that learning is inhibited when the viscosity of the hydraulic oil in the hydraulic control device 25 is high. This makes it possible to prevent occurrence of surging and a shock, which is caused by an excessively high engaging force of the lock-up clutch at normal operating temperatures. Although, in the present embodiment, the learning is inhibited when the engine coolant temperature TW is equal to or lower than the predetermined reference value TWLCREF, this is not limitative, but the learning may be inhibited when oil temperature TOIL, i.e. the temperature of the hydraulic oil for operating the lock-up clutch 23, which is, e.g. detected in the hydraulic control device 25 or estimated based on the engine coolant temperature TW or operating conditions of the torque converter 22, is lower than a predetermined reference value.

Further, in the present embodiment, the predetermined temperature TWLC0 with reference to which it is determined whether or not the lock-up clutch 23 should be disengaged (see the step S2 in FIG. 2) is set to e.g. 30° C., and the region in which the lock-up clutch 23 is engaged is set wider than the learning region (e.g. a region in which the engine coolant temperature TW is higher than the predetermined reference value TWLCREF (70° C.)). Although a value of the learned control amount DOUTR obtained when the engine coolant temperature TW is high can be applied when the engine coolant temperature TW is low, it is possible to prevent occurrence of surging and a shock since the engaging force of the lock-up clutch is set to a lower value than a desired value thereof in such a low temperature condition. In short, it is possible to reduce the fuel consumption by causing the lock-up clutch to be engaged even when the engine coolant temperature TW is low, while preventing occurrence of surging or a shock.

FIG. 11 shows a subroutine for carrying out the duty ratio control in the F/B mode, which is executed at the step S72 in FIG. 6.

First, at a step S131, it is determined whether or not the duty ratio control was also carried out in the F/B mode in the immediately preceding loop. If the duty ratio control was carried out in the F/B mode in the immediately preceding loop, the integral term DI is set to a learned value LREFBi (see steps S148 and S149) at a step S132, and the control duty ratio DOUT is set to the integral term DI at a step S133, followed by the program proceeding to a step S144.

If the control duty ratio was carried out in the F/B mode in the immediately preceding loop, it is determined at a step S134 whether or not the gear position is the fourth speed position. If the gear position is not the fourth speed position, i.e. if it is the third speed position, a coefficient K3FB is calculated at a step S135 by the use of the following equation (16):

$$K3FB = KNOBJ3 + (THW-THLC3L) \times KATTH3 \quad (16)$$

where KNOBJ3 and KATTH3 represent predetermined coefficients, and THLC3L a predetermined reference value of the throttle valve opening. The coefficient K3FB is set such that the slip ratio ETR becomes equal to e.g. approximately 98%.

At the following steps S136 and S137, a desired engine rotational speed value NOBFB3 and a difference DNFB between the engine rotational speed NE and the desired engine rotational speed value NOBFB3 are calculated by the use of the following equations (17) and (18), respectively:

$$NOBFB3 = K3FB \times VP \tag{17}$$

$$DNFB = NE - NOBFB3 \tag{18}$$

Then, the program proceeds to a step S141. On the other hand, if the gear position is the fourth speed position at the step S134, a coefficient K4FB is calculated at a step S138 by the use of the following equation (19):

$$K4FB = KNOBJ4 + (THW - THLC4L) \times KATTH4 \tag{19}$$

where KNOBJ4 and KATTH4 represent predetermined coefficients, and THLC4L a predetermined reference value of the throttle valve opening. The coefficient K4FB is set such that the slip ratio ETR becomes equal to e.g. approximately 96%.

At the following steps S139 and S140, a desired engine rotational speed value NOBFB4 and a difference DNFB between the engine rotational speed NE and the desired engine rotational speed value NOBFB4 are calculated by the use of the following equations (20) and (21), respectively:

$$NOBFB4 = K4FB \times VP \tag{20}$$

$$DNFB = NE - NOBFB4 \tag{21}$$

Then, the program proceeds to the step S141.

At the step S141, the proportional term DP and the addend term DDI are calculated by the use of the following equations (22) and (23):

$$DP = KPFB \times DNFB \tag{22}$$

$$DDI = KIFB \times DNFB \tag{23}$$

Then, at steps S142 and S143, the integral term DI and the control duty ratio DOUT are respectively calculated by the use of the following equations (24) and (25) by applying the above calculated DP and DPI values thereto:

$$DI = DI(n-1) + DDI \tag{24}$$

$$DOUT = DI + DP \tag{25}$$

Then, the program proceeds to the step S144.

At the step S144, it is determined whether or not the DOUT value is larger than a predetermined limit value DLMT. If DOUT ≤ DLMT holds, the program jumps to a step S146, whereas if DOUT > DLMT holds, the control duty ratio DOUT is set to the predetermined limit value DLMT, and then the program proceeds to the step S146. At the step S146, it is determined whether or not the engine coolant temperature TW is higher than the predetermined reference value TWLCREF. If TW ≤ TWLCREF holds, the program is immediately terminated, whereas if TW > TWLCREF holds, it is determined at a step S147 whether or not the gear position is the fourth speed position. Then, depending on the gear position, at a step S148 or S149, a learned value LREFFBi (LREFFB3 or LREFFB4) of the control duty ratio DOUT is calculated by the use of the following equation (26):

$$LREFFBi = CREFFB \times DOUT/A + (A - CREFDEC) \times LREFFBi(n-1)/A \tag{26}$$

where CREFFB represents an averaging coefficient which is set to a value between "1" and A.

The program then proceeds to a step S150, wherein limit checking of the calculated LREFFBi value is carried out, followed by terminating the program.

As described above, according to the duty ratio control in the F/B mode shown in FIG. 11, the DOUT value is determined at the steps S135 to S143 such that the slip ratio ETR becomes equal to a desired value smaller than 100% (i.e. NM<NE), and at the same time the learned value LREFFBi of the control duty ratio DOUT is calculated at each gear position at the steps S148 and S149. The calculated learned value LREFFBi is applied at the step S132 as an initial value of the integral term DI immediately after transition to the F/B mode.

Further, if the engine coolant temperature TW is determined to be low (i.e. TW ≤ TWCREF holds) at the step S146, calculation of the learned value LREFFBi of the control duty ratio DOUT is inhibited, which means that learning is inhibited when the viscosity of the hydraulic oil in the hydraulic control device 25 is high. This makes it possible to prevent occurrence of surging and a shock, which is caused by an excessively high engaging force of the lock-up clutch at normal operating temperatures.

Figure 12:
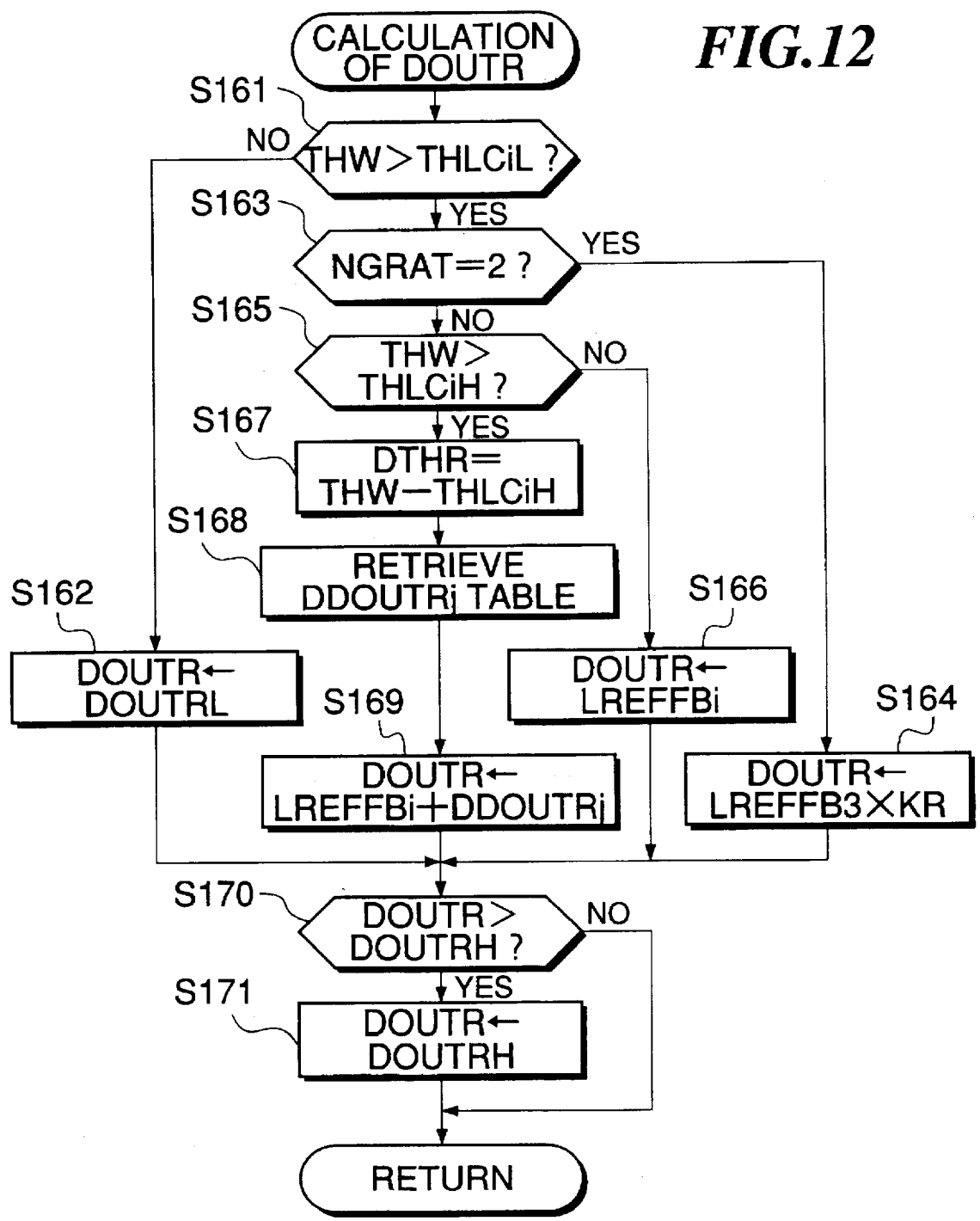
FIG. 12 is a flowchart showing a subroutine for calculating a learned control amount DOUTR, which is executed at a step S77 in FIG. 7.

FIG. 12 shows a subroutine for calculating the learned control amount DOUTR, which is executed at the step S77 in FIG. 7.

First, it is determined at a step S161 whether or not the throttle valve opening THW is larger than the predetermined low load-side reference value THLCiL calculated at the step S42 in FIG. 5. If THW ≤ THLCiL holds, the learned control amount DOUTR is set to a predetermined value DOUTRL at a step S162, followed by the program proceeding to a step S170.

Figure 13A:
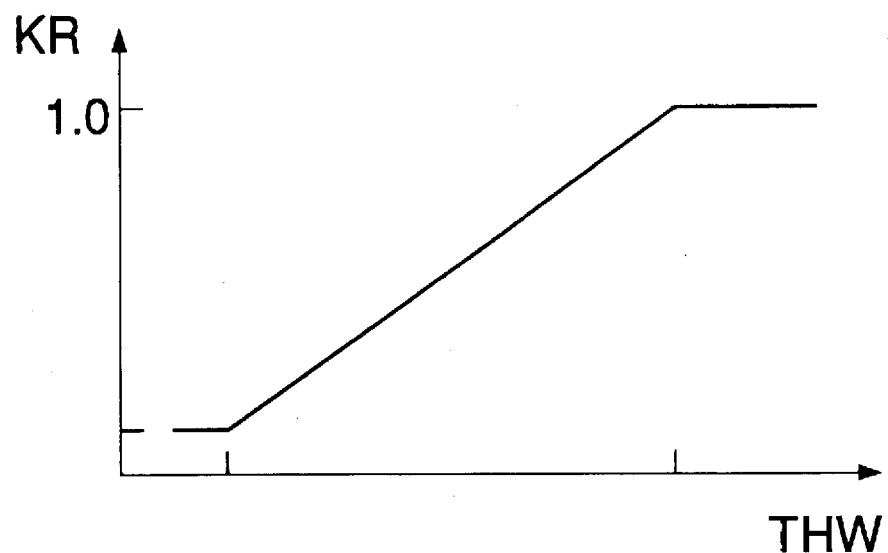
FIG. 13A shows a table for use in determining a correction coefficient KR to be applied in the FIG. 12 subroutine.

If THW > THLCiL holds at the step S161, it is determined at a step S163 whether or not the gear position NGRAT is the second speed position. If the gear position NGRAT is the second speed position, the program proceeds to a step S164, wherein the learned control amount DOUTR is calculated by the following equation, followed by the program proceeding to the step S170:

$$DOUTR = LREFFB3 \times KR \tag{27}$$

where LREFFB3 represents the learned value of the control duty ratio for the third speed position obtained in the F/B mode at the step S148 in FIG. 11, and KR a correction coefficient which is calculated by retrieving a KR table shown in FIG. 13A according to the throttle valve opening THW. The KR table is set such that the KR value increases as the throttle valve opening becomes larger.

As described above, according to the routine shown in FIG. 12, at the steps S163 and S164, the lock-up clutch 23 is engaged even when the gear position is the second speed position, and the learned control amount DOUTR is calculated by correcting the learned value LREFFB for the third speed position according to the throttle valve opening THW to thereby control the engaging force. This makes it possible to carry out the lock-up control at the lower speed position without degrading the driveability while suppressing an increase in the required capacity of the memory device of the ECU 2.

If the gear position is not the second speed position at the step S163, it is determined at a step S165 whether or not the throttle valve opening THW is larger than the predetermined high load-side reference value THLCiH. If THW ≤ THLCiH holds, the learned control amount DOUTR is set to the learned value LREFFBi at a step S166, followed by the program proceeding to the step S170.

Figure 13B:
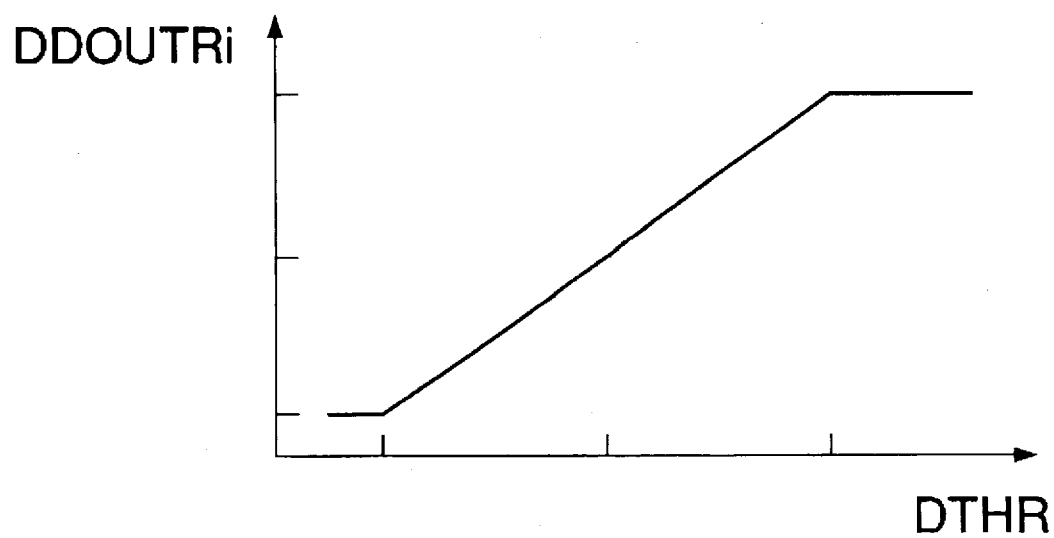
FIG. 13B shows a table for use in determining a correction amount DDOUTRj to be applied in the FIG. 12 subroutine.

If THW > THLCiH holds at the step S165, a difference DTHR (=THW−THLCiH) between the throttle valve opening THW and the predetermined high load-side reference value THLCiH is calculated at a step S167, and then a correction amount DDOUTRj is calculated by retrieving a DDOUTRj table shown in FIG. 13B according to the difference DTHR. The DDOUTRj table is set such that the correction amount DDOUTR increases as the difference DTHR becomes larger. The suffix "j" indicates that different tables are provided for the D3 and D4 ranges, respectively, i.e. that a corresponding table is used depending on the shift position. However, the tables are set in a similar manner, as shown in FIG. 13B, for both of the D3 range and the D4 range.

At the following step S169, the learned control amount DOUTR is calculated by the use of the following equation (28):

$$DOUTR = LREFFBi + DDOUTRj \qquad (28)$$

Then, the program proceeds to the step S170.

At the step S170, it is determined whether or not the learned control amount DOUTR is larger than a predetermined upper limit value DOUTRH. If DOUTR≦DOUTRH holds, the program is immediately terminated, whereas if DOUTR>DOUTRH holds, the DOUTR value is set to the predetermined upper limit value DOUTRH at a step S171, followed by terminating the program.

As described above, according to the FIG. 12 routine, when the throttle valve opening THW is smaller than the predetermined lower limit value THLCiL, the learned control amount DOUTR is set to the predetermined reference value DOUTRL, and in the other cases it is set to the learned value LREFFBi or a value obtained by correcting the learned value LREFFBi, depending on the gear position, the shift position and the throttle valve opening THW.

Figure 14:
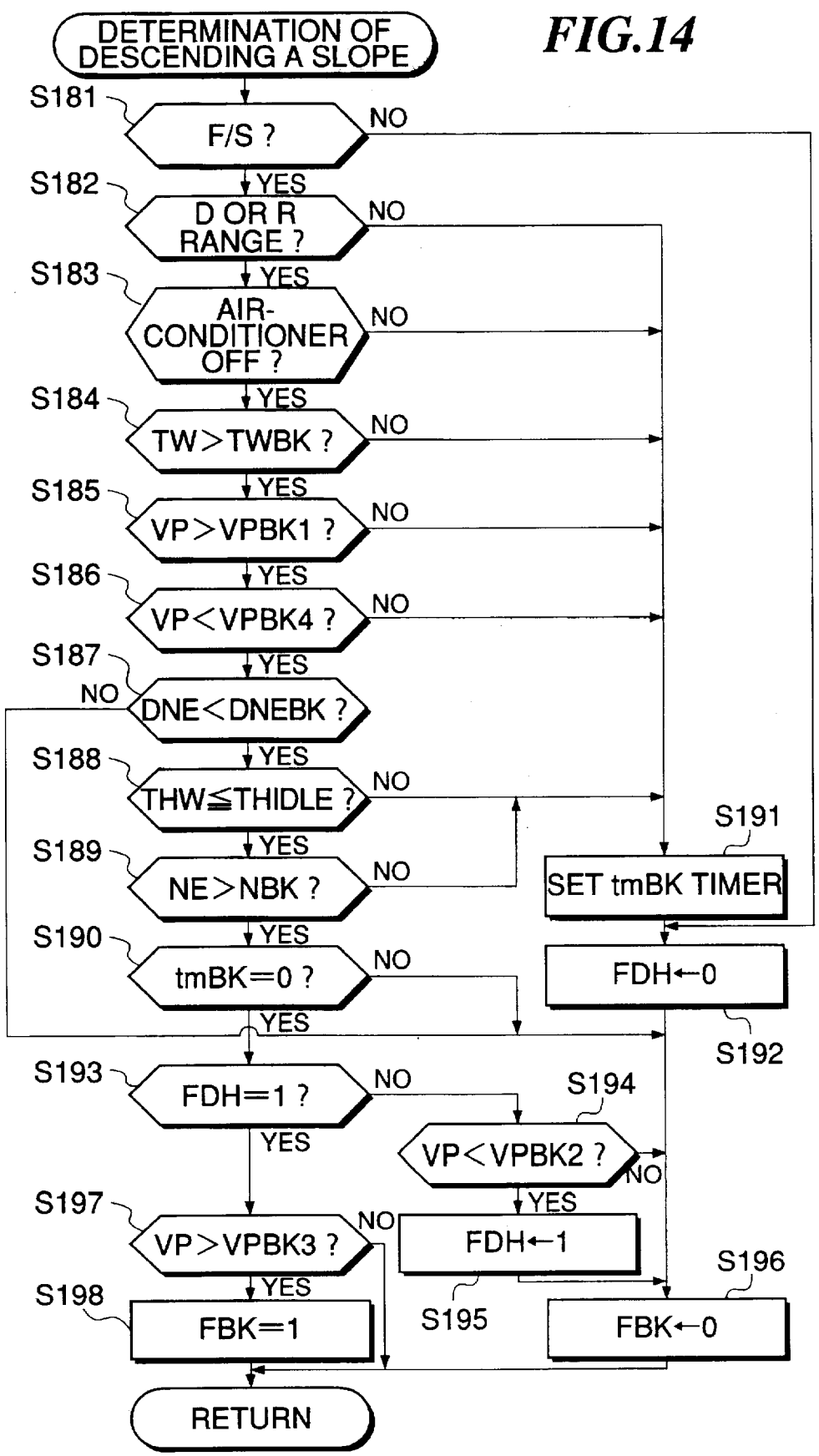
FIG. 14 is a flowchart showing a routine for determining whether or not the vehicle is descending a slope.

FIG. 14 shows a routine for determining whether the vehicle is descending a slope, which is executed in synchronism with generation of each TDC signal pulse.

First, it is determined at a step S181 whether or not abnormality is detected of any of the sensors and the like. If abnormality is detected, a predetermined traveling condition flag FDH, which, when set to "1", indicates that the vehicle is in a predetermined traveling condition, referred to hereinafter (see step S195), is reset to "0" at a step S192, and then the descent-determining flag FBK is set to "0" at a step S196, followed by terminating the program.

If no abnormality is detected of any of the sensors and the like, it is determined at a step S182 whether or not the shift position is the D range (the D3 or D4 range) or a reverse range (hereinafter referred to as "the R range"). If the shift position is the D range or in the R range, it is determined at a step S183 whether or not an air conditioner installed on the vehicle is in operation. If the air conditioner is not in operation, it is determined at a step S184 whether or not the engine coolant temperature TW is higher than a predetermined value TWBK. If TW>TWBK holds, it is determined at a step S185 whether or not the vehicle speed VP is higher than a predetermined lower limit value VPBK1 (e.g. 35 km/h). If VP>VPBK1 holds, it is determined at a step S186 whether or not the vehicle speed VP is lower than a predetermined upper limit value VPBK4 (e.g. 70 km/h). If VP<VPBK4 holds, it is determined at a step S187 whether or not the decrement DNE of the engine rotational speed NE is smaller than a predetermined reference value DNEBK. If DNE<DNEBK holds, it is determined at a step S188 whether or not the throttle valve opening THW is equal to or smaller than the predetermined reference value THIDLE. If THW≦THIDLE holds, it is determined at a step S189 whether or not the engine rotational speed NE is higher than a predetermined reference value NBK (e.g. 700 rpm).

If any of the answers to the questions of the steps S182 to S186, S188 and S189 is negative (NO), a tmBK downcount timer is set to a predetermined time period TBK (e.g. a time period within a range of 5 to 10 seconds) and started at a step S191, followed by the program proceeding to the step S192. If the decrement DNE of the engine rotational speed NE is not smaller than the predetermined reference value DNEBK, the program jumps to a step S196.

On the other hand, if all the answers to the questions of the steps S182 to S189 are affirmative (YES), it is determined at a step S190 whether or not the count tmBK of the tmBK downcount timer is equal to "0". As long as tmBK>0 holds, the program proceeds to the step S196, and when the count tmBK becomes equal to "0", the program proceeds to a step S193, wherein it is determined whether or not the predetermined traveling condition flag FDH assumes "1". The flag FDH is initially set to "0", so that the answer of the question at the step S193 which is first executed is affirmative (YES), and then the program proceeds to a step S194, wherein it is determined whether or not the vehicle speed VP is lower than a first reference value VPBK2 (e.g. 45 km/h). If VP≧VPBK2 holds, the program jumps to the step S196, whereas if VP<VPBK2 holds, it is judged that the engine is in the predetermined traveling condition, and then the flag FDH is set to "1" at the step S95, followed by the program proceeding to the step S196.

When the flag FDH is set to "1", the answer to the question of the step S193 becomes affirmative (YES), so that the program proceeds to a step S197, wherein it is determined whether or not the vehicle speed VP is higher than a second reference value VPBK3 (e.g. 55 km/h). If VP≦VPBK3 holds, the program is immediately terminated, whereas if VP>VPBK3 holds, it is judged that the vehicle is descending a slope, and the descent-determining flag FBK is set to "1" at a step S198, followed by terminating the program.

The relationship between the reference lower limit value VPBK1, the reference upper limit value VPBK4, the first reference value VPBK2 and the second reference value VPBK3 is expressed as VPBK1<VPBK2<VPBK3<VPBK4.

According to the FIG. 14 routine described above, it is judged that the vehicle is descending a slope when a condition in which all the answers to the questions of the steps S182 to S189 are affirmative (YES) has continued for more than the predetermined time period TBK, and at the same time a condition in which VPBK1<VP<VPBK3 holds has shifted to a condition in which VP>VPBK3 holds. That is, in this routine, the descent of the vehicle is not determined based on acceleration of the vehicle, and therefore it is possible to carry out an accurate descent-determination e.g. even when the vehicle is descending a long and gentle slope with little acceleration. Further, in the present embodiment, the descent-determining flag FBK set as above is referred to at the step S28 in FIG. 3, whereby the A solenoid valve 25a is engaged when the vehicle is descending a slope, to thereby enlarge the operating region in which the lock-up clutch is engaged. This makes it possible to effectively apply engine brake.

What is claimed is:

1. A lock-up control system for an automatic transmission of an automotive vehicle, said automotive vehicle having an internal combustion engine installed thereon, said automatic transmission having a lock-up clutch for mechanically engaging said automatic transmission with said engine to enable transmission of a driving force output from said engine to said automatic transmission, said lock-up control system controlling operation of said lock-up clutch, said lock-up control system comprising:

operating condition-detecting means for detecting operating conditions of said automotive vehicle and said engine including load on said engine;

first engaging force control means for controlling an engaging force of said lock-up clutch, in an predetermined operating region of said automotive vehicle which is determined based on said operating conditions of said automotive vehicle and said engine detected by said operating condition-detecting means, in a manner such that an amount of slip of said lock-up clutch becomes equal to a desired value;

learning means for learning an engaging force control amount for controlling said engaging force of said lock-up clutch when said automotive vehicle is traveling in said predetermined operating region with said automatic transmission being in a predetermined speed position;

memory means for storing a learned value of said engaging force control amount obtained by said learning means;

corrected engaging force control amount-calculating means for calculating a corrected engaging force control amount by correcting said learned value of said engaging force control amount stored in said memory means according to said load on said engine, when said automotive vehicle is traveling with said automatic transmission being in a speed position which is suitable for a lower traveling speed of said automotive vehicle than said predetermined speed position; and second engaging force control means for controlling said engaging force of said lock-up clutch by the use of said corrected engaging force control amount, when said automotive vehicle is traveling with said automatic transmission being in said speed position which is suitable for said lower speed of said automotive vehicle than said predetermined speed position.

2. A lock-up control system according to claim 1, wherein said corrected engaging force control amount-calculating means calculates said corrected engaging force control amount in a manner such that said engaging force of said lock-up clutch becomes larger as said load on said engine is larger.

3. A lock-up control system according to claim 1, wherein said corrected engaging force control amount-calculating means calculates said corrected engaging force control amount by correcting said learned value stored in said memory means according to said load on said engine when said load on said engine is larger than a predetermined value, and sets said corrected engaging force control amount to a predetermined value when said load on said engine is equal to or smaller than said predetermined value.

4. A lock-up control system according to claim 1, including means for permitting said second engaging force control means to control said engaging force of said lock-up clutch by the use of said corrected engaging force control amount when said automotive vehicle is traveling at a higher speed than a predetermined value.

5. A lock-up control system according to claim 1, wherein said predetermined speed position of said automatic transmission is a third speed position, and said speed position which is suitable for said lower speed of said automotive vehicle than said predetermined speed position is a second speed position.

6. A lock-up control system for an automatic transmission of an automotive vehicle, said automotive vehicle having an internal combustion engine installed thereon, said automatic transmission having a lock-up clutch for mechanically engaging said automatic transmission with said engine to enable transmission of a driving force output from said engine to said automatic transmission, said lock-up control system controlling operation of said lock-up clutch, said lock-up control system comprising:

operating condition-detecting means for detecting operating conditions of said automotive vehicle and said engine;

engaging force control means for controlling an engaging force of said lock-up clutch, in an predetermined operating region of said automotive vehicle determined based on said operating conditions of said automotive vehicle and said engine detected by said operating condition-detecting means, in a manner such that an amount of slip of said lock-up clutch becomes equal to a desired value;

learning means for learning an engaging force control amount for controlling said engaging force of said lock-up clutch when said automatic transmission is in said predetermined operating region;

memory means for storing a learned value of said engaging force control amount obtained by said learning means;

initial value-setting means for setting an initial value of said engaging force control amount based on said learned value of said engaging force control amount stored in said memory means when a transition to said predetermined operating region from an operating region other than said predetermined operating region takes place; and learning-inhibiting means for inhibiting said learning means from learning said engaging force control amount, when a parameter representative of temperature of a hydraulic oil for operating said lock-up clutch is lower than a predetermined value.

7. A lock-up control system according to claim 6, wherein said parameter is temperature of engine coolant detected by said operating condition-detecting means.

8. A lock-up control system according to claim 6, wherein said parameter is the temperature of said hydraulic oil detected by said operating condition-detecting means.

9. A lock-up control system according to claim 6, wherein said predetermined operating region includes a decelerating region in which said load on said engine is substantially equal to zero, said automatic transmission is in a speed position suitable for a higher traveling speed of said automotive vehicle than a second speed position, and at the same time said automotive vehicle is traveling at a higher speed than a predetermined value.

10. A lock-up control system according to claim 9, including descent-determining means for determining whether said automotive vehicle is descending a slope in said decelerating region, and wherein said learning-inhibiting means inhibits said learning means from learning said engaging force control amount when it is determined that said automotive vehicle is descending a slope in said decelerating region.

11. A lock-up control system according to claim 10, wherein said descent-determining means comprises operating condition continuation-determining means for determining whether said automotive vehicle has been continuously been in a predetermined operating condition over a predetermined time period, and determining means for determining that said automotive vehicle is descending a slope if a change in a traveling speed of said automotive vehicle has occurred from a value below a first predetermined value to a value above a second predetermined value higher than said first predetermined value when it is determined that said automotive vehicle has been continuously been in said predetermined operating condition over said predetermined time period.

12. A lock-up control system according to claim 6, said predetermined operating region includes a feedback control region in which said automotive vehicle is traveling at a speed within a predetermined range determined by predetermined upper and lower limit values thereof, and at the same time load on said engine is within a predetermined range determined by predetermined upper and lower limit values thereof.

13. A lock-up control system for an automatic transmission of an automotive vehicle, said automotive vehicle having an internal combustion engine installed thereon, said automatic transmission having a torque converter for transmitting a driving force output from said engine, and a lock-up clutch arranged in parallel with said torque converter, for mechanically engaging said torque converter with said engine to enable transmission of said driving force output from said engine to said torque converter, said lock-up control system controlling operation of said lock-up clutch, said lock-up control system comprising:
operating condition-detecting means for detecting operating conditions of said automotive vehicle and said engine;
operating condition continuation-determining means for determining whether said automotive vehicle has been continuously been in a predetermined operating condition over a predetermined time period;
descent-determining means for determining that said automotive vehicle is descending a slope if a change in a traveling speed of said automotive vehicle has occurred from a value below a first predetermined value to a value above a second predetermined value higher than said first predetermined value when it is determined that said automotive vehicle has been continuously been in said predetermined operating condition over said predetermined time period; and
operating region-enlarging means for enlarging an operating region within which said lock-up clutch is to be operated, when it is determined by said descent-determining means that said automotive vehicle is descending a slope.

14. A lock-up control system according to claim 13, wherein said engine includes a throttle valve, said predetermined operating condition of said automotive vehicle is an operating condition in which said throttle valve is substantially fully closed and at the same time a rate of decrease in rotational speed of said engine is smaller than a predetermined value.

15. A lock-up control system for an automatic transmission of an automotive vehicle, said automotive vehicle having an internal combustion engine installed thereon, said automatic transmission having a torque converter for transmitting a driving force output from said engine, and a lock-up clutch arranged in parallel with said torque converter, for mechanically engaging said torque converter with said engine to enable transmission of said driving force output from said engine to said torque converter, said lock-up control system controlling operation of said lock-up clutch, said lock-up control system comprising:
operating condition-detecting means for detecting operating conditions of said automotive vehicle and said engine;
operating condition continuation-determining means for determining whether said automotive vehicle has been continuously been in a predetermined operating condition over a predetermined time period;
descent-determining means for determining that said automotive vehicle is descending a slope if a change in a traveling speed of said automotive vehicle has occurred from a value below a first predetermined value to a value above a second predetermined value higher than said first predetermined value when it is determined that said automotive vehicle has been continuously been in said predetermined operating condition over said predetermined time period; and
engaging force-increasing means for increasing said engaging force of said lock-up clutch when it is determined by said descent-determining means that said automotive vehicle is descending a slope.

16. A lock-up control system according to claim 15, wherein said engine includes a throttle valve, said predetermined operating condition of said automotive vehicle is an operating condition in which said throttle valve is substantially fully closed and at the same time a rate of decrease in rotational speed of said engine is smaller than a predetermined value.

17. A lock-up control system according to claim 9, wherein said engaging force-increasing means includes means for controlling said engaging force of said lock-up clutch in a manner such that said rotational speed of said engine is increased when it is determined by said descent-determining means that said automotive vehicle is descending a slope.

\* \* \* \* \*